(12) United States Patent
Fernández Gutierrez

(10) Patent No.: US 8,189,584 B2
(45) Date of Patent: May 29, 2012

(54) MULTICAST TRAFFIC MANAGEMENT IN A NETWORK INTERFACE

(75) Inventor: Alvaro Fernández Gutierrez, Barcelona (ES)

(73) Assignee: Media Patents, S. L., Barcelona (ES)

( * ) Notice: Subject to any disclaimer, the term of this patent is extended or adjusted under 35 U.S.C. 154(b) by 391 days.

(21) Appl. No.: 12/641,199

(22) Filed: Dec. 17, 2009

(65) Prior Publication Data

US 2011/0019673 A1    Jan. 27, 2011

(30) Foreign Application Priority Data

Jul. 27, 2009    (ES) .................................. 200930512

(51) Int. Cl.
*H04L 12/56* (2006.01)
(52) U.S. Cl. ........................................ 370/390; 370/400
(58) Field of Classification Search .................. 370/390, 370/400
See application file for complete search history.

(56) References Cited

U.S. PATENT DOCUMENTS

| | | | |
|---|---|---|---|
| 4,024,505 A | 5/1977 | Sperling | |
| 4,149,238 A | 4/1979 | James et al. | |
| 5,835,370 A | 11/1998 | Nakamura | |
| 6,331,983 B1 | 12/2001 | Haggerty et al. | |
| 6,370,142 B1 | 4/2002 | Pitcher et al. | |
| 6,393,507 B2 | 5/2002 | Klein | |
| 6,434,622 B1 | 8/2002 | Monteiro et al. | |
| 6,457,059 B1 | 9/2002 | Kobayashi | |
| 6,721,318 B1 | 4/2004 | Cai et al. | |
| 6,741,595 B2 | 5/2004 | Maher, III et al. | |
| 6,785,294 B1 | 8/2004 | Ammitzbøll et al. | |
| 6,914,907 B1 | 7/2005 | Bhardwaj et al. | |
| 6,977,891 B1 | 12/2005 | Ranjan et al. | |
| 7,068,598 B1 | 6/2006 | Bryson | |
| 7,236,465 B2 | 6/2007 | Banerjee et al. | |
| 7,272,652 B1 | 9/2007 | Keller-Tuberg | |
| 7,283,521 B1 | 10/2007 | Ryan | |
| 7,346,053 B1 | 3/2008 | Leung et al. | |
| 7,355,970 B2 | 4/2008 | Lor | |
| 7,385,977 B2 | 6/2008 | Wu et al. | |

(Continued)

FOREIGN PATENT DOCUMENTS

EP    1185125 A1    3/2002

(Continued)

OTHER PUBLICATIONS

K. McCloghrie et al., Internet Engineering Task Force, Request for Comments 2578, "The structure of Management Information Version 2, SMIv2", Apr. 1999; currently available on the Internet at http://www3.tools.ietf.org/html/rfc2578.

(Continued)

*Primary Examiner* — Dang Ton
*Assistant Examiner* — Ryan Kavleski
(74) *Attorney, Agent, or Firm* — Tim L Kitchen; K Kalan; Berenbaum Weinshienk PC

(57) ABSTRACT

A method for filtering in a network interface of a computer system multicast packets in a manner that reduces or obviates altogether the processing of unwanted multicast packets by the processing unit of the computer system. Filtering in the network interface is accomplished by the network interface accessing multicast traffic request information originating in the computer system and comparing the accessed information with the multicast destination address and IP source address of packets received in the network interface.

20 Claims, 13 Drawing Sheets

U.S. PATENT DOCUMENTS

| | | |
|---|---|---|
| 7,412,726 B1 | 8/2008 | Viswanath |
| 7,450,551 B2 | 11/2008 | Lim et al. |
| 7,477,654 B2 | 1/2009 | Murray et al. |
| 7,502,474 B2 | 3/2009 | Kaniz et al. |
| 7,512,146 B1 | 3/2009 | Sivasankaram et al. |
| 7,599,289 B2 | 10/2009 | Caci |
| 7,599,393 B1 | 10/2009 | Ho |
| 7,640,333 B1 | 12/2009 | Fernandez Gutierrez |
| 8,102,870 B2 * | 1/2012 | Guo et al. ............ 370/432 |
| 2002/0099857 A1 | 7/2002 | Lowe et al. |
| 2003/0067917 A1 | 4/2003 | Morrison et al. |
| 2003/0123453 A1 | 7/2003 | Ooghe et al. |
| 2004/0022244 A1 | 2/2004 | Boers et al. |
| 2004/0117503 A1 | 6/2004 | Nguyen et al. |
| 2004/0122890 A1 | 6/2004 | Watkinson |
| 2004/0158872 A1 | 8/2004 | Kobayashi |
| 2004/0165709 A1 | 8/2004 | Pence et al. |
| 2004/0190542 A1 | 9/2004 | Ono et al. |
| 2004/0202295 A1 | 10/2004 | Shen et al. |
| 2004/0219911 A1 | 11/2004 | Kouchri et al. |
| 2004/0252690 A1 | 12/2004 | Pung et al. |
| 2004/0255126 A1 | 12/2004 | Reith |
| 2005/0041680 A1 | 2/2005 | Tanaka et al. |
| 2005/0063544 A1 | 3/2005 | Uusitalo et al. |
| 2005/0174937 A1 | 8/2005 | Scoggins et al. |
| 2005/0175156 A1 | 8/2005 | Afshar et al. |
| 2005/0190765 A1 | 9/2005 | Gotoh et al. |
| 2005/0207354 A1 | 9/2005 | Nekovee et al. |
| 2005/0265374 A1 | 12/2005 | Pelt |
| 2006/0018255 A1 | 1/2006 | Tankhiwale |
| 2006/0036733 A1 | 2/2006 | Fujimoto et al. |
| 2006/0050643 A1 | 3/2006 | Yoshimoto et al. |
| 2006/0059163 A1 | 3/2006 | Frattura et al. |
| 2006/0088031 A1 | 4/2006 | Nalawade |
| 2006/0095766 A1 | 5/2006 | Zhu et al. |
| 2006/0104308 A1 | 5/2006 | Pinkerton et al. |
| 2006/0114908 A1 | 6/2006 | Kalkunte et al. |
| 2006/0120368 A1 | 6/2006 | Aboukarr et al. |
| 2006/0146792 A1 | 7/2006 | Ramachandran et al. |
| 2006/0146857 A1 | 7/2006 | Naik et al. |
| 2006/0159092 A1 | 7/2006 | Boers et al. |
| 2006/0182109 A1 | 8/2006 | Melsen et al. |
| 2006/0209829 A1 | 9/2006 | Lo et al. |
| 2006/0221861 A1 | 10/2006 | Previde et al. |
| 2006/0221958 A1 | 10/2006 | Wijnands et al. |
| 2006/0239289 A1 | 10/2006 | Zheng et al. |
| 2006/0262792 A1 | 11/2006 | Rokui |
| 2006/0274720 A1 | 12/2006 | Adams et al. |
| 2007/0011350 A1 | 1/2007 | Lu et al. |
| 2007/0041558 A1 | 2/2007 | Parayil et al. |
| 2007/0047545 A1 | 3/2007 | Bou-Diab et al. |
| 2007/0064695 A1 | 3/2007 | Song et al. |
| 2007/0124454 A1 | 5/2007 | Watkinson |
| 2007/0143858 A1 | 6/2007 | Hearty |
| 2007/0168555 A1 | 7/2007 | Dorenbosch |
| 2007/0177594 A1 | 8/2007 | Kompella |
| 2007/0183403 A1 | 8/2007 | Somers |
| 2007/0183418 A1 * | 8/2007 | Riddoch et al. ............ 370/389 |
| 2007/0211722 A1 | 9/2007 | Subramanian |
| 2007/0255824 A1 | 11/2007 | Granzer |
| 2007/0297376 A1 | 12/2007 | Gass |
| 2007/0297418 A1 | 12/2007 | Lee |
| 2008/0056243 A1 | 3/2008 | Roy et al. |
| 2008/0095146 A1 | 4/2008 | Granzer |
| 2008/0095183 A1 | 4/2008 | Bijwaard et al. |
| 2008/0123644 A1 | 5/2008 | Storry et al. |
| 2008/0219237 A1 | 9/2008 | Thubert et al. |
| 2009/0059911 A1 | 3/2009 | Fine |
| 2009/0100147 A1 | 4/2009 | Igarashi |
| 2009/0100194 A1 | 4/2009 | Bhadri et al. |
| 2009/0190518 A1 | 7/2009 | Kim et al. |
| 2009/0310609 A1 | 12/2009 | Fernandez Gutierrez |
| 2009/0319689 A1 | 12/2009 | Fernandez Gutierrez |
| 2010/0005499 A1 | 1/2010 | Covey |
| 2010/0014519 A1 | 1/2010 | Fernandez Gutierrez |
| 2010/0040056 A1 * | 2/2010 | Kobayashi ............ 370/390 |
| 2010/0046516 A1 | 2/2010 | Fernandez Gutierrez |
| 2010/0054247 A1 | 3/2010 | Fernandez Gutiérrez |
| 2010/0054248 A1 | 3/2010 | Fernandez Gutiérrez |
| 2010/0054249 A1 | 3/2010 | Fernández Gutiérrez |
| 2010/0172351 A1 | 7/2010 | Fernéndez Gutierrez |
| 2010/0172352 A1 | 7/2010 | Fernández Gutierrez |
| 2010/0172353 A1 | 7/2010 | Fernández Gutierrez |
| 2010/0183008 A1 | 7/2010 | Fernandez Gutierrez |
| 2010/0254383 A1 | 10/2010 | Fernandez Gutierrez |
| 2011/0010441 A1 | 1/2011 | Fernandez Gutierrez |
| 2011/0058548 A1 | 3/2011 | Fernandez Gutierrez |
| 2011/0058551 A1 | 3/2011 | Fernandez Gutierrez |

FOREIGN PATENT DOCUMENTS

| | | |
|---|---|---|
| EP | 1318628 A1 | 11/2003 |
| EP | 1389862 A1 | 2/2004 |
| EP | 1429489 A2 | 6/2004 |
| EP | 1432172 A2 | 6/2004 |
| EP | 1734688 A1 | 12/2006 |
| EP | WO2009049659 | 4/2009 |
| EP | WO2009056175 | 5/2009 |
| EP | 2078376 B1 | 12/2010 |
| WO | WO0203614 A2 | 1/2002 |
| WO | WO2006001803 A1 | 1/2006 |
| WO | WO2009/000306 A1 | 12/2008 |
| WO | WO2009000306 | 12/2008 |
| WO | WO2009065526 | 5/2009 |
| WO | WO2009095041 | 8/2009 |
| WO | WO2009095041 A1 | 8/2009 |
| WO | WO2009109684 | 9/2009 |
| WO | WO2010072611 A1 | 7/2010 |
| WO | WO2010097288 A1 | 9/2010 |
| WO | WO2011012582 A2 | 2/2011 |

OTHER PUBLICATIONS

K. McCloghrie et al., Internet Engineering Task Force, Request for Comments 2579, "Textual Conventions for SMIv2", Apr. 1999; currently available on the Internet at http://www3.tools.ietf.org/html/rfc2579.

D. Harrington et al., Internet Engineering Task Force, Request for Comments 3411, "An Architecture for Describing Simple Network Management Protocol (SNMP) Management Frameworks", Dec. 2002, currently available on the Internet at http://www3.tools.ietf.org/html/rfc3411.

E. Al-Shaer et al., "Toward Integrating IP Multicasting in Internet Network Management Protocols", Computer Communications, vol. 24, No. 5, Mar. 15, 2001, pp. 473-485, Publisher: Elsevier.

R. Vida et al., Engineering Task Force, Network Working Group, Request for Comments 3810, Jun. 2004; currently available at Internet address http://tools.ietf.org/html/rfc3810.

B. Fenner et al., Engineering Task Force, Network Working Group, Request for Comments 4605, Aug. 2006; currently available at Internet address http://tools.ietf.org/html/rfc4605.

B. Fenner et al., Engineering Task Force, Network Working Group, Request for Comments 4601, Aug. 2006; currently available at Internet address http://tools.ietf.org/html/rfc4601.

International Preliminary Report on Patentability for PCT/ES2009/070047 dated Oct. 14, 2010.

European Search Report for European Patent Application No. 10189098.6 issued by the European Patent Office dated Dec. 10, 2010.

Author(s): Rui Fan; Shi-Duan Cheng; Yu Lin Title: WRHMCC: A New Congestion Control Mechanism for Multicast Applications Source: Global Telecommunications Conference, 2003. GLOBECOM '03. IEEE vol. 5, 2003 pp. 2845-2849 Accession No. 10.1109/GLOCOM.2003.1258754.

Author(s): Pompili, Dario et al. Title: Multicast Algorithms in Service Overlay Networks. Source: Computer Communications; Feb. 2008, vol. 31 Issue 3, p. 489-505, 17p Accession No. 28769089.

Author(s): El-Derini, M.N.; Aly, H.H.; Yassin, M.A. Title: Supporting a Multicast Communication for Large Scale Groups Source: Electrotechnical Conference, 2002. MELECON 2002. 11th Mediterranean May 7-9, 2002 pp. 7-11 Accession No. 10.1109/MELECON.2002.1014515.

Author(s): Stephen Lawson Title: IP Multicast Finds a Role Inside the Firewall. (audio- and video-streaming technology may be used on enterprise networks) (Internet/Web/Online Service Information)(Column). Source: InfoWorld 18.n41 (Oct. 7, 1996): pp. 51(1). (413 words).

Author(s): Cain et al. Title: Internet Group Management Protocol Source: Version 3 (RFC 3376, Engineering Task Force, Network Working Group, Request for Comments 3376, Oct. 2002).

Author(s): Zhang, Beichuan; Wang, Wenjie; Jamin, Sugih; Massey, Daniel; Zhang, Lixia Title: Universal IP Multicast Delivery Source: Computer Science Department, University of Arizona, Tucson, AZ 85721-0077, United States.

Author(s): Stephen Deering; Deborah Estrin; Dino Farinacci; Van Jacobson; Ching-Gung Liu; Liming Wei Title: An Architecture for Wide-Area Multicast Routing Source: SIGCOMM '94: Proceedings of the conference on Communications architectures, protocols and applications.

Author(s): Stephen Deering; Deborah Estrin; Dino Farinacci; Van Jacobson; Ching-Gung Liu; Liming Wei Title: The PIM Architecture for Wide-Area Multicast Routing Source: IEEE/ACM Transactions on Networking (TON), vol. 4 Issue 2.

Author(s): Ritvanen, Kaarle Title: Multicast Routing and Addressing Source: Seminar on Internetworking, 2004.

Author(s): Paul, Pragyansmita et al. Title: Survey of Multicast Routing Algorithms and Protocols Source: Proceedings of the 15th International Conference on Computer Communication, 2002.

El-Derini, M.N. et al., Supporting a Multicast Communication for Large Scale Groups, 2002, IEEE MELECON, p. 7-11. (D11).

Lawful Interception (LI); Handover Interface and Service-Specific Details (SSD) for IP delivery; Part 5: Service-Specific Details for IP Multimedia Services; ETSI TS 102 232-5' ETSI Standards, LIS, Sophia Antipolis Cedex, France, vol. LI, No. V2.3.1, Apr. 1, 2008, XP014041613, ISSN: 0000-0001, p. 6-7, p. 10-15. (D12).

M Handley UCL V Jacobson Packet Design C Perkins University of Glasgow: "SDP: Session Description Protocol; rfc4566.txt" IETF Standard, Internet Engineering Task Force, IETF, CH, Jul. 1, 2006, XP015055003, ISSN: 0000-0003, p. 11. (CD13).

European Patent Office, Transmittal of International Search Report and the Written Opinion of the International Searching Authority for International Application No. PCT/EP2009/061577, Feb. 8, 2010. (D14).

Communications Assistance for Law Enforcement Act of 1994, At the Second Session, One Hundred Third Congress of the United States of America, Pub. L. No. 103-414, 108 Stat. 4279; Amendment to Title 18, United States Code. (D15).

Cain et al., "Internet Group Management Protocol, Version 3," Internet Engineering Task Force, Network Working Group; Request for Comments: 3376; Oct. 2002.

PCT Application No. PCT/EP2010/060815; Patent Cooperation Treaty International Search Report and Written Opinion issued by the European Patent Office dated Feb. 8, 2011.

* cited by examiner

MULTICAST TRAFFIC MANAGEMENT IN A NETWORK INTERFACE

CROSS-REFERENCE TO RELATED APPLICATION

This application claims priority to and the benefit of Spanish Patent Application No. P200930512 filed Jul. 27, 2009.

FIELD OF THE INVENTION

The invention relates to the field of multicast technology.

BACKGROUND

Multicast technology makes it possible to send data from a single source to many recipients through a data network, without having to set up unicast communication, i.e. one-to-one individual communication between the source and each of the recipients. To that end, the source sends data, in data packet form, to a single address associated to a multicast group to which the equipment interested in being recipients of the data sending can subscribe. This address referred to as a multicast address or also as a multicast group address, is an IP (Internet Protocol) address chosen within a range that is reserved for multicast applications. The data packets which have been sent by the source to the multicast address are then replicated in the different network routers so that they can reach the recipients that have joined the multicast group.

The recipients that receive data in a multicast group are usually, but not always, equipment connected to the data network by means of a proxy or a router. Hereinafter, the term "host" will be used to refer to the recipient equipment. A host can be, for example, a computer, a set-top box (digital signal decoder) connected to a television set, or any other device capable of receiving data packets.

When a host wants to receive the information sent by one or several sources of a multicast group, it usually sends via a router or an intermediate proxy a subscription message to subscribe to the group so that the router transmits to it the data arriving through the data network and which has been sent by the sources of the multicast group. Likewise, when a host wishes to stop receiving data packets from a multicast group, it usually sends via the router or the proxy an unsubscribe message to stop receiving the data packets.

The messages exchanged between a host and a router to manage membership to a multicast group generally use the IGMP protocol (Internet Group Management Protocol) or the MLD (Multicast Listener Discovery) protocol, according to whether or not the router works with version 4 (IPv4) or version 6 (IPv6) of the IP protocol (Internet Protocol), respectively. When there is a proxy between the host and the router, the proxy also uses the IGMP/MLD protocols to exchange with the host, the closest router or other intermediate proxy, the multicast group membership messages. In these cases, the proxy can receive from different hosts requests to subscribe to or to unsubscribe from a multicast group, and it assembles them to thus reduce IGMP/MLD message traffic it sends to the router. Hereinafter, the generic term IGMP proxy will be used to designate a proxy using the IGMP/MLD protocols.

FIGS. 1, 2, and 3 show different messages used in the IGMPv3 (IGMP version 3) protocol. FIG. 1 shows a "Membership Query Message" which is a message sent by IGMPv3 routers to the hosts so that the hosts respond with messages that indicate the multicast traffic that they wish to receive. FIG. 2 shows a "Membership Report Message" which is a message sent by the hosts to the routers to indicate the multicast traffic that they wish to receive. This information sent by the hosts in the Membership Report type messages is organized into different blocks of data referred to as "Group Records". The structure of these group records is shown in FIG. 3.

In addition, routers exchange messages with one another for the purpose of defining the routing which allows efficient routing of the data from the sources to the hosts that have subscribed to a multicast group. To that end, the routers use specific protocols, including the very well known PIM-SM (Protocol Independent Multicast—Sparse Mode).

In summary, the routers receive from the hosts, in the form of IGMP/MLD messages, information specifying which multicast groups they want to receive traffic from, and they communicate with other routers, for example by means of the PIM-SM protocol, for the purpose of setting up a routing which takes the traffic requested by the hosts to such hosts. All of the aforementioned protocols are defined and documented by the Internet Engineering Task Force (IETF).

The IGMP protocol version currently being used is IGMPv3, which is described in the RFC 3376 specifications published on line by the IETF (B. Cain et al., Engineering Task Force, Network Working Group, Request for Comments 3376, October 2002; currently available at Internet address http://tools.ietf.org/html/rfc3376).

With regard to the MLD protocol, the version currently being used is MLDv2, which is described in the RFC 3810 specifications published on line by the IETF (R. Vida et al., Engineering Task Force, Network Working Group, Request for Comments 3810, June 2004; currently available at Internet address http://tools.ietf.org/html/rfc3810).

The operation of an IGMP proxy is described in the RFC 4605 specifications published on line by the IETF (B. Fenner et al., Engineering Task Force, Network Working Group, Request for Comments 4605, August 2006; currently available at Internet address http://tools.ietf.org/html/rfc4605).

The PIM-SM protocol used for the communication between routers is described in the RFC 4601 specifications published on line by the IETF (B. Fenner et al., Engineering Task Force, Network Working Group, Request for Comments 4601, August 2006; currently available at Internet address http://tools.ietf.org/html/rfc4601).

Multicast technology was initially implemented primarily to be applied to the many-to-many communication model, known as ASM (Any Source Multicast), in which many users communicate with one another and any of them can send data and also receive data from everyone else. A typical ASM application is multiparty calling via Internet. Multicast technology was then implemented to be applied to the one-to-many communication model known as SSM (Source Specific Multicast), in which a single source sends data for many recipients.

In earlier IGMP protocol versions, a host could not choose the data sending sources it did not want to subscribe to within a multicast group, rather the host could only subscribe to or unsubscribe from the group for all the sources. The messages a host sent to a router were very simple: Join (G) to receive traffic from the multicast group G and Leave (G) to stop receiving it. Therefore, earlier IGMP protocol versions did not allow SSM. The possibility that the hosts could choose the sources within a multicast group was introduced in the IGMPv3 version of the IGMP protocol to allow SSM. To that end, a host can send IGMP messages containing data blocks referred to as Group Record in which the host defines the sources from which traffic is to be received for each multicast group. These Group Record data blocks in an IGMP message can be of several types:

An INCLUDE type Group Record data block containing information on source IP addresses from which the host wishes to receive data sending. According to the terminology of the RFC 3376 specifications, the sources chosen by means of an IGMP message containing an INCLUDE type Group Record are referred to as INCLUDE sources.

An EXCLUDE type Group Record data block, containing information on source IP addresses from which the host does not wish to receive data sending. In this case, it is interpreted that the host wishes to receive data sent by all the sources of the multicast group except the sources indicated as excluded in the message. According to the terminology of the RFC 3376 specifications, the excluded sources by means of an IGMP message containing an EXCLUDE type Group Record are referred to as EXCLUDE sources.

Channel (S, G) is used hereinafter, and according to the common nomenclature in SSM technology, to refer to the sending of source S of the multicast group G.

In the third version of the IGMP protocol (IGMPv3) it was decided that for a multicast group each network interface can only operate in one of the following modes, being able to pass from one to another: the INCLUDE mode, where the network defines a list of INCLUDE sources, or the EXCLUDE mode, where the network defines a list of EXCLUDE sources. The RFC 3376 specifications describe a method with which the hosts can select the multicast traffic that they wish to receive. A brief summary of this operation is provided below.

Paragraph 2, entitled "The Service Interface for Requesting IP Multicast Reception" of the RFC 3376 specifications describes a service interface that can be used by the upper network layers of the host protocols or the host programs in order to request that the IP network layer accept or reject the multicast traffic from certain multicast addresses. For this purpose, it uses a function known as IPMulticastListen.

The RFC 3376 specifications of the IGMPv3 explain that the systems must support IGMP messages as per the following function, which enables a host to choose the multicast data sources:

IPMulticastListen (socket, interface, multicast-address, filter-mode, {source-list})

where:

"socket" is a parameter used to distinguish the different applications that are executed on the system (for example, programs and processes) and which call to the IPMulticastListen function.

"interface" is a local identifier for the network card or network interface on which one wishes to receive the multicast traffic indicated in the call to the IPMulticastListen function. If it is wished to receive the same multicast traffic on more than one network interface, the IPMulticastListen function is called separately for each network interface.

"multicast-address" is the multicast group address.

"filter-mode" is the network interface mode, which may be INCLUDE or EXCLUDE. In the INCLUDE mode, the network interface defines the source-list as INCLUDE; this means that it wishes to receive the multicast group traffic sent by all the sources in the list. In the EXCLUDE mode, the network interface defines the source-list as EXCLUDE; this means that it wishes to receive the multicast group traffic from all the sources sent in the multicast group, except the sources in the list.

"source-list" is the INCLUDE or EXCLUDE source-list.

For a given socket combination, network interface, and multicast group, there can only be one "filter mode", which may be INCLUDE or EXCLUDE.

The system stores a state record for each active socket. This register contains the following information:

(interface, multicast-address, filter-mode, {source-list})

For each socket, the "filter-mode" of the record can only be INCLUDE or EXCLUDE.

Likewise, the system stores a state record for each network interface and multicast group. This record contains the following information:

(multicast-address, filter-mode, {source-list})

Each network interface and multicast group has a state record storing the information on the interface and group and the state record contains a field referred to as filter-mode which can only be of the INCLUDE type, containing only INCLUDE sources, or of the EXCLUDE type, containing only EXCLUDE sources. The rules that are transcribed below are applied when the network interface record must result from the combination of different records:

Rule 1. If any of the data sources of a group G1 is EXCLUDE, then the network interface will have an EXCLUDE filter-mode for the group G1 and the source list of the network interface is the intersection of the EXCLUDE source lists minus the sources of the INCLUDE lists.

Rule 2. If all the sources are INCLUDE type sources, then the network interface will have an INCLUDE filter-mode for the group G1 and the source list is the union of all the INCLUDE sources.

The hosts send IGMP messages to the routers via each network interface in order to request multicast traffic, and the content of the messages is typically derived from information in state records associated with given network interface stored in a memory of the computer system.

There are generally two types of events that may cause the host to send IGMP messages to the routers. These are the receipt of an IGMP Query message or a change on the status registers of the network interface caused by, for example, a call to the IPMulticastListen function or other application.

Routers using the IGMP and PIM-SM protocols store the multicast traffic information that they must transmit through each network. This information consists of storing, for each network interface of the router, state information about multicast channels (S,G) or multicast groups (*,G) for which there is at least one host interested in receiving this multicast traffic, with a timer associated to each channel or multicast group that indicates the time passed since the router received the last message requesting this multicast traffic.

Table 1, extracted from RFC 3376, summarizes the operation of a router according to the IGMPv3 protocol. In Table 1, the first column "State 1" shows the initial state of the record of the IGMP router; the second column "Message" shows the content of a Membership Report message received by the IGMP router; the third column "State 2" shows the state of the record of the IGMP router after having received the Membership Report message; the fourth and last column "Actions" shows the actions that the IGMP router carries out after having received the Membership Report message. Table 1 contains 12 rows respectively corresponding to 12 processes which each illustrates the operation of the router according to its initial state (column 1) and according to the messages it has received (column 2).

Table 1 relates to a specific network interface of a router executing the IGMPv3 protocol and to a specific multicast group G. Each network interface and multicast group G will have their own state records which will be affected by the messages that the IGMP router receives through the network interface relating to the group G. The following nomenclature has been used in Table 1:

(A+B) means the union of the sets of sources A and B.

(A*B) means the intersection of the sets of sources A and B.

(A−B) means the set of sources A minus the sources of A that are also found in B.

INCLUDE (A) indicates that the IGMP router has a record with INCLUDE filter-mode with a set of sources A.

EXCLUDE (X,Y) indicates that the IGMP router has a record with EXCLUDE filter-mode because there are EXCLUDE sources, wherein:
X is the Requested List of EXCLUDE sources
Y is the Exclude List of EXCLUDE sources.

GMI is a parameter referred to as Group Membership Interval containing a value of time. A value of 260 seconds is used by default.

T (S) is the source timer of source S.

GT is the Group Timer, i.e. the timer of the record for switching from EXCLUDE mode to INCLUDE mode.

SEND Q(G, S) means that the IGMP router sends a Group-And-Source-Specific Query message to the hosts to check if there is still a host interested in receiving the sendings from sources S of multicast group G. When this action is carried out, the IGMP router also reduces the timers of the sources S to the LMQT value. If the IGMP router receives in response a message showing interest in any of the sources S, it then initializes the value of the timers of the sources, for which there is an interested host, to an initial value equal to GMI.

DEL(A) means that the IGMP router deletes from the record the sources of list A.

LMQT is a parameter referred to as Last Member Query Time containing a time value. It is the time a host has to reply to a Group-And-Source-Specific Query type message which has been sent by the IGMP routers. After this time, if no host replies that it is interested in receiving the channels specified in the message, the IGMP router stops transmitting them. The value of LMQT in the IGMPv3 protocol is 20 seconds by default.

The messages in column 2 of Table 1 are the six types of IGMP messages defined in the IGMPv3 protocol for indicating to the router the sources from which it wishes to obtain multicast traffic. The meaning of these six IGMP messages is described in RFC 3376 (chapter 4.2.12) and is as follows:

IS_IN (Z), IS_EX (Z) indicate that the network interface of the host that has sent the message has an INCLUDE or EXCLUDE filter-mode, respectively, for the sources of list Z.

TO_IN (Z), TO_EX (Z) indicate that the network interface of the host that has sent the message has switched the filter-mode from EXCLUDE mode to INCLUDE mode, or from INCLUDE mode to EXCLUDE mode, respectively, for the sources of list Z.

ALLOW (Z) indicates that the network interface of the host that has sent the message wishes to receive the traffic from the new sources of list Z. These sources are the sources that the network interface will add to its INCLUDE source list or they are the sources that it will delete from its EXCLUDE source list.

BLOCK (Z) indicates that the network interface of the host that has sent the message no longer wishes to receive traffic from the sources of list Z. These sources are the sources that the network interface will delete from its INCLUDE source list or they are the sources that it will add to its EXCLUDE source list.

It can be seen that the 12 rows of Table 1 correspond to 12 combinations of an initial state record of the router (column 1) and of a type of IGMP message received (column 2). The router consults the hosts by means of a Group-And-Source-Specific Query message (SEND messages in column 4 of Table 1) for checking if there is a host interested in receiving multicast data from those sources, the traffic of which was being initially transmitted (column 1 of Table 1) and no longer wishes to receive according to the sources indicated in the last received IGMPv3 message (column 2 of Table 1).

The presence of switches on data networks is common, especially in "Local Area Networks" (LAN). A switch is an electronic network interconnection device that normally operates at layer 2 (the data link layer) of the OSI model ("Open Systems Interconnection"). The OSI model is the open systems interconnection reference model created by the ISO ("International Organization for Standardization") and is known to one skilled in the art.

In computer networking, a "frame" or a "data frame" is a digital data transmission unit on the layer 2 of the OSI model. RFC 1122 defines a frame as "the unit of transmission in a link layer protocol, and consists of a link layer header followed by a packet"

A switch interconnects two or more network segments, passing data frames from one segment to another using the layer 2 destination address of the data frames (for example, the "MAC address" in Ethernet networks). In order to send the data frames to the devices connected to each one of its ports, a switch determines and stores the layer 2 address of each device connected to each of its ports.

The low-level protocol group most used on local area networks is currently the Ethernet protocol group, defined according to IEEE ("Institute of Electrical and Electronics Engineers") specifications. Ethernet defines both the physical layer (layer 1) and the data link layer (layer 2) in the OSI model, and divides the data link layer into two sublayers: one layer known as LLC "Logical Link Control") which is established in the IEEE 802.2 specifications, and a MAC ("Media Access Control") layer, which is established in the different IEEE 802.3 specifications, such as IEEE 802.3u ("Fast Ethernet") based on electric cabling, or IEEE 802.3z based on fiber-optics. There are also wireless Ethernet protocols, like IEEE 802.11, also known as WIFI, or IEEE 802.16 known as WIMAX.

The same LLC (Logical Link Control) protocol can be used with different MAC layer protocols since the IEEE establishes new MAC layer protocols without modifying the LLC protocol. This is one of the reasons for the success of Ethernet.

One of the functions of the MAC layer is to determine the physical addresses of the devices. Ethernet uses 6-byte physical addresses referred to as MAC addresses ("Media Access Control Address").

The IEEE has identified three MAC address categories:

Unicast MAC addresses: these are MAC addresses that identify each individual network interface. Normally the address is determined by the hardware of each network card.

MAC broadcast address: this is the MAC address with 6 bytes having the value FFFF.FFFF.FFFF in hexadecimal format. If a data frame is sent to this address, all the network devices receive the data frame and must process it.

MAC multicast addresses: these are addresses used to transport multicast data packets. When IP protocol is used, a MAC multicast address takes the form 0100.5exx.xxxx in the hexadecimal system, where xx.xxxx may be a value between 00.0000 and 7f.ffff.

Bit 0 of Octet 0 in an IEEE MAC address indicates whether the destination address is broadcast/multicast address or a unicast address. If this bit is set (value=1) then the frame is a broadcast frame or a multicast frame.

In the case of Ethernet IP multicast frames, all of them use MAC layer addresses that begin with the 24 bit prefix 01.00.5E.XX.XX.XX. But only half of these MAC addresses are avail-able for use by IP multicast. This leaves 23 bits of MAC address space for mapping the layer 3 IP multicast address into the layer 2 MAC address.

As there are only 23 bits to determine a MAC multicast address of a data frame, while the IPv4 protocol uses 28 bits to determine an IP multicast address in an IP data packet (the first 4 bits of an IP multicast data packet are always 1110 in binary notation), the 28 bits of the IP multicast address of an IP data packet must be transferred to the 23 bits of the MAC multicast address of the corresponding data frame. Therefore, 5 bits of the IP multicast address are lost in this process. The transfer is therefore made by transferring the 23 least significant bits of the IP multicast address to the 23 bits of the MAC multicast address. Hence, a single MAC multicast address corresponds to 32 IP multicast addresses.

Referring now to FIGS. 4 and 5, different types of layer 2 Ethernet packets or frames encapsulating a layer 3 IP packet are shown.

The preamble of an Ethernet frame consist of a 56-bit (7-byte) pattern of alternating 1 and 0 bits, which allows device on the network to easily detect a new incoming frame.

The Start Frame Delimiter (SFD) is the 8 bit value marking the end of the preamble of an Ethernet frame. It has the value 10101011. The SFD is designed to break the pattern of the preamble, and signal the start of the actual frame. The SFD is immediately followed by the destination MAC address.

Every Ethernet network card has a unique 48-bit serial number called MAC address, which is stored in ROM or EEPROM carried on the card. The MAC address identifies the device uniquely on the LAN.

The destination MAC address (DA) field indicates the MAC address of the network interface of the intended recipient of the packet. The DA field also indicates whether or not the packet contains a multicast or broadcast data. Other fields within the packet may also indicate whether the data is carrying is multicast or broadcast, for example the IP destination address when the payload is a IPv4 packet.

The Source MAC address field provides the identification of the node from which the data packet originated. It identifies the origin node using the MAC address of the network interface of the origin node.

The EtherType is a two octet field indicating the data type encapsulated in the payload (the frame data field). For example, an EtherType value of 0x0800 indicates that the payload contains an IPv4 datagram.

When the original Ethernet standard, developed by DEC, Intel and Xerox, went through a formal IEEE standardization process, the EtherType field was changed to a data length field in the new 802.3 standard. This standard required an IEEE 802.2 header to follow the length field to specify the packet type.

In order to allow packets using different versions of Ethernet framing in the same network, EtherType values must be greater or equal to 1536 (0x0600). That value was chosen because the maximum length of the data field of an Ethernet 802.3 frame is 1500 bytes. If the field's value is greater than or equal to 1536, the field must be an EtherType. If the field's value is less or equal 1500 it must be a length field. Values between 1500 and 1535 are undefined.

FIG. 4 shows an Ethernet packet 420 with a Length field 425. To create a Type field for frames that use the EtherType/Length field as Length field, either one or two additional headers 430 are added after the 802.3 header but before layer 3 header 411. For example, when sending IP packets 410 the Ethernet frame has two additional headers: an IEEE 802.2 Logical Link Control (LLC) header 431 and an IEEE Sub-network Access Protocol (SNAP) header 432. FIG. 4 shows these additional headers in the field 421. The arrow 427 indicates that the structure of the field 421 is detailed in the element 430. Note that the SNAP header Type 435 has the same purpose, with the same reserved values, as the Ethernet EtherType field. The 802.2 LLC Header 431 comprise the DSAP field (Destination Service Access Point), the SSAP field (Source Service Access Point) and a control field indicated as CTL in FIG. 4. The SNAP Header 432 comprises the OUI field (IEEE Organizationally Unique Identifier) followed by the 2-octet TYPE field that is a protocol identifier like the ETHERTYPE field.

The data portion 422 includes the layer 3 IP packet. In FIG. 4 the data portion 422 is an IP packet 410 comprising an IP Header 411 and IP payload 412. Lines 413 and 414 in FIG. 4 indicate that IP packet 410 is encapsulated in data portion 422.

FIG. 5 shows an Ethernet packet 520 with an EtherType field 525. In this case there are no additional headers with the EtherType field indicating the type of data in the data portion 522. In FIG. 5 the data portion 522 is an encapsulated IP packet 410 as indicated by lines 513 and 514.

The Frame Check Sequence are the extra checksum characters added to a frame for error detection and correction Although it is not technically correct, the terms packet and frame are sometimes used interchangeably within the art. The IEEE 802.3 standards refer to MAC frames consisting of the destination address, the source address, length/type, data payload and frame check sequence fields. The preamble and the Start Frame Delimiter (SFD) are together considered a header to the MAC frame. This header and the MAC frame are considered a packet.

FIG. 6 shows a router 600 (e.g., IGMP router) situated between a first network 610 and a second network 611. In the example of FIG. 6, the first network 610 is connected to the downstream network interface 602 of router 600, and includes three hosts (620, 630 and 640). The second network 611 is connected to the upstream network interface 601 of router 600, and includes four sources (650, 660, 670 and 680) that send data packets. Each of the sources and hosts have a network interface which are represented by elements 625, 635, 645, 655, 665, 675 and 685 in FIG. 6. Each of networks 610 and 611 may be of any of a variety of network types, such as, for example, an Ethernet, WIFI, or WiMAX network, or any other type of data network that uses a shared medium to transmit data.

Via their respective network interfaces 625, 635 and 645, the hosts 620, 630 and 640 may receive the multicast data frames (layer 2 of the OSI model) that transport the multicast IP packets (layer 3 of the OSI model) from the multicast channels (S1,G1) and (S3,G1) in the form of physical signals (layer 1 of the OSI model). When network interfaces 625, 635 and 645 receive a layer 2 data frame that transports an IP packet with a multicast destination IP address, such as an Ethernet data frame with a MAC multicast destination address, the network interfaces 625, 635 and 645 process the data frame and transmit its contents to an application of its respective host (e.g., an operating system application) which verifies the destination and/or origin addresses of the packet and decides whether or not the packet must be discarded or sent to one of the applications being run in the host.

As shown in FIG. 6, sources 650 and 670 send multicast data packets (represented by elements 691a and 693a, respectively) using a multicast address G1. These packets may be link-layer packets that encapsulate multicast IP packets having an IP multicast destination address. Data source 650 sends the multicast IP packets 691a of the channel (S1,G1) that are encapsulated in frames that use a link layer source address (e.g., a MAC address) of the network interface 655 of source 650 and the multicast link layer destination address corresponding to the multicast group address G1 using the lower 23 bits of the multicast group address G1 as explained before. Data source 670 sends the multicast IP packets 693a of the channel (S3,G1) that are encapsulated in frames that use a link layer source address (e.g., a MAC address) of the network interface 675 of source 670 and the multicast link layer destination address corresponding to the multicast group address G1.

In the example of FIG. 6, hosts 620 and 630 each send a message to router 600 to request multicast traffic from sources S1 and S3, respectively, with host 650 not wishing to receive any multicast traffic. The message from host 620 may be an IGMPv3 message requesting the traffic (S1,G1) coming from source 650, where S1 is the IP address of the data source 650 and G1 is a multicast group address used by data source 650 to transmit multicast traffic. The message from host 630 may be an IGMPv3 message requesting the traffic (S3,G1) coming from source 670, where S3 is the IP address of the data source 670 and G1 is a multicast group address used by data source 660 to transmit multicast traffic. When the IGMP router 600 receives the messages from hosts 620 and 630, it transmits to the network 610 via network interface 602 the multicast IP packets 691b and 693b corresponding to data packets 691a and 693a sent from channels (S1,G1) and (S3,G1), respectively.

A problem that exists is that each of the hosts 620, 630 and 640 in network 610 must devote processing resources to analyze all of the data packets transmitted in network 610 to determine whether to receive or discard the packets. In the example of FIG. 6, host 640 which is not interested in receiving any multicast traffic must nevertheless waste processing resources to analyze and subsequently discard multicast IP packets 691b and 693b. In a like manner, hosts 620 and 630 must each waste processing resources to analyze and subsequently discard multicast IP packets 693b and 691b, respectively.

If the multicast channel (S1,G1) is, for example, an IPTV channel transmitting at about 3 Mbps, the hosts 630 and 640 must analyze a vast number of IP packets every second in order to discard them. As more multicast traffic is circulating through network 610, more processing resources must be assigned by the hosts in order to discard the multicast traffic that they do not want. In addition to affecting processing operations of the hosts, the charge life of batteries that operate mobile computing devices, such as mobile phones, is also reduced.

Another problem associated with the operation of the data network system of FIG. 6 is that the sending of multiple IP multicast packets to network 610 is possible for the purpose of attacking and at least partially disabling the operation of one or more of hosts 620, 630 and 640.

Even in networks where multicast IP packets are sent from sources to hosts without an intermediary router, multicast filtering using either the layer 2 destination addresses or the layer 2 source addresses of frames. For example using the destination or source MAC address in Ethernet networks, there exists a problem since, for among other reasons, it does not permit source specific multicast filtering due to the fact that one multicast MAC address corresponds to 32 IP multicast addresses.

In a data network where a router is situated between the sources that send data and the hosts, source specific filtering is not possible using layer 2 filtering since the layer 2 source address of the multicast IP packets is lost during router processing. In FIG. 6, when router 600 receives in its upstream network interface 601 a link layer data packet containing an IP packet, for example the 691a and 693a multicast packets, the router removes the frame header and transmits the IP packet. In general, the routing process forwards only the IP packet and discards link layer headers and trailers along the way. When the router 600 transmits IP packets 691b and 693b of the multicast channels (S1,G1) and (S3,G1) to network 610 through its downstream network interface 602, the router 600 creates new link layer data packets to encapsulate the multicast IP packets. These new link layer packets use the link layer source address of the network interface 602 and use the multicast link layer destination address formed using the lowest 23 bits of the multicast group address G1. The link layer packets that encapsulate the IP packets of the multicast channels (S1,G1) and (S3,G1) use the same link layer destination address and the same link layer source address.

When the hosts 620, 630 and 640 receive the link layer data packets containing the IP multicast packets of the multicast channels (S1,G1), the link layer source address of the network interface 655 of source 650 is not present in the link layer packet because it was removed in the router 600. The same happens with the link layer packets containing the IP multicast packets of the multicast channel (S3,G1). That is, the link layer source address of the interface 665 is lost during the routing process. For this reason, when a multicast IP packet goes through a router It is not possible to filter the multicast traffic of a multicast group from different sources using the link layer destination address or the link layer source address.

In other words, when source specific multicast is used, source specific multicast traffic filtering by a host cannot be accomplished using layer 2 filtering because in source specific multicast the IP source address for the multicast traffic that a host wishes to receive is only located in the IP header of the IP packet when the multicast traffic is transmitted through a router. Prior art host network interfaces that use the multicast MAC destination address for filtering multicast traffic have very limited filtering capability. As an example and with continued reference to FIG. 6, when the network interfaces of host 620, 630 and 640 filter the multicast traffic of the group G1 using the corresponding multicast MAC address, the multicast traffic from all the sources 650, 660, 670 and 680 of group G1 are filtered along with the multicast traffic from all the sources for the other 31 multicast group addresses that have the same lowest 23 bits as the lowest 23 bits of the multicast group G1.

SUMMARY OF THE DISCLOSURE

In accordance with one embodiment of the present invention a method of filtering multicast packets in a network interface is provided. In one implementation the network interface is situated between and coupled to a multicast data network and a bus of a computer system with the computer system having a first memory, the method comprising storing for the network interface and a multicast group address information in the first memory for the purpose of enabling or disabling transmission through the network interface to the bus of the computer system multicast packets sent from sources using the multicast group address, the information comprising first data that identifies the network interface, second data that identifies the multicast group address, third data that denotes an INCLUDE filter-mode or an EXCLUDE filter-mode, and fourth data that identifies a source-list of zero or more IP source addresses, the network interface accessing the second, third and fourth data, receiving in the network interface a multicast packet from the multicast data network, determining in the network interface the multicast group address and IP source address of the multicast packet, determining in the network interface if transmission of the multicast packet from the network interface to the bus is to be enabled or disabled by comparing the multicast group address and the IP source address of the multicast packet with the accessed second, third and fourth data; and upon determining that the transmission of the multicast packet is to be enabled, the network interface transmitting the multicast packet to the bus, or upon determining that the transmission of the multicast packet is to be disabled, the network interface not transmitting the multicast packet to the bus. In one embodiment accessing of the second, third and fourth data by the network interface is accomplished by the network interface reading the second, third and fourth data from the first memory. In another embodiment accessing of the second, third and fourth data by the network interface is accomplished by the network interface copying the second, third and fourth data from the first memory into a second memory of the network interface. In another embodiment accessing of the second, third and fourth data by the network interface is accomplished by the computer system sending from the first memory the second, third and fourth data to the network interface for storage in a second memory of the network interface. In another embodiment accessing of the second, third and fourth data by the network interface is accomplished by an IPMulticastListen operation in the computer system sending the second, third and fourth data to the network interface for storage in a second memory of the network interface.

In accordance with another embodiment, a method of filtering multicast packets in a network interface situated between and coupled to a multicast data network and a bus of a computer system is provided, the method comprising the network interface accessing, via the bus, information in the computer system for the purpose of enabling or disabling transmission through the network interface to the bus of the computer system multicast packets sent from sources in the multicast data network, the information comprising first data that identifies a multicast group address, second data that denotes an INCLUDE filter-mode or an EXCLUDE filter-mode, and third data that identifies a source-list of zero or more IP source addresses, receiving in the network interface a multicast packet from the multicast data network, determining in the network interface the multicast group address and IP source address of the multicast packet, determining in the network interface if transmission of the multicast packet from the network interface to the bus is to be enabled or disabled by comparing the multicast group address and the IP source address of the multicast packet with the accessed first, second, and third data; and upon determining that the transmission of the multicast packet is to be enabled, the network interface transmitting the multicast packet to the bus, or upon determining that the transmission of the multicast packet is to be disabled, the network interface not transmitting the multicast packet to the bus.

In accordance with another embodiment, a method of filtering IP multicast packets in a network interface situated between and coupled to a multicast data network and a bus of a computer system is provided, the method comprising the network interface storing information for the purpose of enabling or disabling the transmission of IP multicast packets from sources in the multicast data network through the network interface to the bus of the computer system, the information comprising first data that identifies an IP multicast group address, second data that denotes an INCLUDE filter-mode or an EXCLUDE filter-mode, and third data that identifies a source-list of zero or more IP source addresses, receiving in the network interface an IP multicast packet from the multicast data network, determining in the network interface the IP multicast group address and the IP source address of the IP multicast packet, determining in the network interface if transmission of the IP multicast packet from the network interface to the bus is to be enabled or disabled by comparing the IP multicast group address and the IP source address of the IP multicast packet with the first, second and third data; and upon determining that the transmission of the IP multicast packet is to be enabled, the network interface transmitting the IP multicast packet to the bus, or upon determining that the transmission of the IP multicast packet is to be disabled, the network interface not transmitting the IP multicast packet to the bus.

In accordance with another embodiment, a method of filtering multicast packets in a network interface situated between and coupled to a multicast data network and a bus of a computer system is provided. The computer system has a first memory and the network interface has a second memory. The method comprising an application of the computer system initiating a request for the purpose of enabling or disabling reception of multicast packets from the multicast data network, the request comprising first data that identifies the network interface, second data that identifies a multicast group address to which the request pertains, third data that denotes an INCLUDE filter-mode or an EXCLUDE filter-mode, and fourth data that identifies a source-list of zero or more IP source addresses, storing the first, second, third and fourth data in the first memory, the network interface accessing the second, third and fourth data, receiving in the network interface a multicast packet from the multicast data network, determining in the network interface the multicast group address and IP source address of the multicast packet, determining in the network interface if reception of the multicast packet is to be enabled or disabled by comparing the multicast group address and the IP source address of the multicast packet with the second, third and fourth data stored in the second memory; and upon determining that the reception of the multicast packet is to be enabled, the network interface transmits the multicast packet to the bus, or upon determining that the reception of the multicast packet is to be disabled, the network interface not transmitting the multicast packet to the bus.

In accordance with another embodiment, a method of filtering IP multicast packets in a network interface situated between and coupled to a multicast data network and a bus of a computer system is provided, the method comprising the network interface storing first information for the purpose of enabling or disabling the transmission of IP multicast packets from the multicast data network through the network interface to the bus of the computer system, the first information comprising first data that identifies an IP multicast group address, second data that denotes an INCLUDE filter-mode or an EXCLUDE filter-mode, and third data that identifies a source-list of zero or more IP source addresses, the network interface storing second information for the purpose of always enabling the transmission of selected IP multicast packets from the multicast data network through the network interface to the bus of the computer system, the second information comprising fourth data that identifies an IP multicast group address, fifth data that denotes an INCLUDE filter-mode or an EXCLUDE filter-mode, and sixth data that identifies a source-list of zero or more IP source addresses, receiving in the network interface an IP multicast packet from the multicast data network, determining in the network interface the IP multicast group address and the IP source address of the IP multicast packet, if a filtering conflict exists between the first information and the second information stored in the network interface, selecting either the first information or the second information for use in determining whether to enable or disable transmission of the IP multicast packet to the bus, determining in the network interface if transmission of the IP multicast packet from the network interface to the bus is to be enabled or disabled by 1) comparing the IP multicast group address and the IP source address of the IP multicast packet with the first, second and third data if no conflict exists between the first information and the second information or if the first information is selected for use in determining whether to enable or disable transmission of the IP multicast packet to the bus when a conflict exists between the first information and the second information, or 2) comparing the IP multicast group address and the IP source address of the IP multicast packet with the fourth, fifth and sixth data if the second information is selected for use in determining whether to enable or disable transmission of the IP multicast packet to the bus when a conflict exists between the first information and the second information; and upon determining that the transmission of the IP multicast packet is to be enabled, the network interface transmitting the IP multicast packet to the bus, or upon determining that the transmission of the IP multicast packet is to be disabled, the network interface not transmitting the IP multicast packet to the bus.

In accordance with another embodiment, a method of filtering IP multicast packets in a network interface situated between and coupled to a multicast data network and a bus of a computer system is provided, the method comprising the network interface storing first information for the purpose of enabling or disabling the transmission of IP multicast packets from the multicast data network through the network interface to the bus of the computer system, the first information comprising first data that identifies an IP multicast group address, second data that denotes an INCLUDE filter-mode or an EXCLUDE filter-mode, and third data that identifies a source-list of zero or more IP source addresses, the network interface storing second information for the purpose of always disabling the transmission of selected IP multicast packets from the multicast data network through the network interface to the bus of the computer system, the second information comprising fourth data that identifies an IP multicast group address, fifth data that denotes an INCLUDE filter-mode or an EXCLUDE filter-mode, and sixth data that identifies a source-list of zero or more IP source addresses, receiving in the network interface an IP multicast packet from the multicast data network, determining in the network interface the IP multicast group address and the IP source address of the IP multicast packet, if a filtering conflict exists between the first information and the second information stored in the network interface, selecting either the first information or the second information for use in determining whether to enable or disable transmission of the IP multicast packet to the bus, determining in the network interface if transmission of the IP multicast packet from the network interface to the bus is to be enabled or disabled by 1) comparing the IP multicast group address and the IP source address of the IP multicast packet with the first, second and third data if no conflict exists between the first information and the second information or if the first information is selected for use in determining whether to enable or disable transmission of the IP multicast packet to the bus when a conflict exists between the first information and the second information, or 2) comparing the IP multicast group address and the IP source address of the IP multicast packet with the fourth, fifth and sixth data if the second information is selected for use in determining whether to enable or disable transmission of the IP multicast packet to the bus when a conflict exists between the first information and the second information; and upon determining that the transmission of the IP multicast packet is to be enabled, the network interface transmitting the IP multicast packet to the bus, or upon determining that the transmission of the IP multicast packet is to be disabled, the network interface not transmitting the IP multicast packet to the bus.

In accordance with another embodiment, a method of filtering multicast data packets in a network interface situated between and coupled to a multicast data network and a bus of a computer system is provided, the method comprising the network interface storing information for the purpose of enabling or disabling the transmission of multicast packets from sources in the multicast data network through the network interface to the bus of the computer system, the information comprising first data that identifies a layer 2 multicast destination address and second data that identifies a layer 2 source address, receiving in the network interface a multicast packet, determining in the network interface the layer 2 destination address and the layer 2 source address of the multicast data packet, determining in the network interface if transmission of the multicast packet from the network interface to the bus is to be enabled or disabled by comparing the layer 2 destination address and the layer 2 source address of the multicast packet with the first and second data; and upon determining that the transmission of the multicast packet is to be enabled, the network interface transmitting the multicast packet to the bus, or upon determining that the transmission of the multicast packet is to be disabled, the network interface not transmitting the multicast packet to the bus.

In accordance with another embodiment, a method of filtering multicast data packets in a network interface situated between and coupled to a multicast data network and a bus of a computer system is provided, the method comprising the network interface storing information for the purpose of enabling or disabling the transmission of multicast packets from sources in the multicast data network through the network interface to the bus of the computer system, the information comprising first data that identifies a layer 2 multicast destination address and second data that identifies a layer 2 source address, receiving in the network interface a data packet, determining in the network interface if the data packet is a multicast packet, if upon determining the data packet is not a multicast packet, the network interface transmits the data packet to the bus, if upon determining the data packet is a multicast packet, the network interface determines the layer 2 destination address and the layer 2 source address of the multicast packet, determining in the network interface if transmission of the multicast packet from the network interface to the bus is to be enabled or disabled by comparing the layer 2 destination address and the layer 2 source address of the multicast packet with the first and second data; and upon determining that the transmission of the multicast packet is to be enabled, the network interface transmitting the multicast packet to the bus, or upon determining that the transmission of the multicast packet is to be disabled, the network interface not transmitting the multicast packet to the bus.

In accordance with another embodiment, a method of filtering IP multicast packets in a network interface situated between and coupled to a multicast data network and a bus of a computer system is provided, the method comprising the computer system requesting to receive IP multicast packets from sources of a multicast group address in the multicast data network by sending through the network interface to equipment in the data network a first membership message, the first membership message comprising first data that identifies a multicast group address, second data that denotes an INCLUDE filter-mode, an EXCLUDE filter-mode, a change to INCLUDE mode, or a change to EXCLUDE mode, and third data that identifies a source-list of zero or more IP source addresses, the network interface reading the first, second and third data in the membership message and storing a state record in a memory of the network interface information derived from the first, second and third data that comprises fourth data that identifies the multicast group address, fifth data that denotes an INCLUDE filter-mode or an EXCLUDE filter-mode, and sixth data that identifies a source-list of zero or more IP source addresses, the third, fourth and fifth data being stored in the memory of the network interface for the purpose of being used by the network interface to enable or disable the transmission of IP multicast packets from the multicast data network through the network interface to the bus of the computer system, receiving in the network interface an IP multicast packet from the multicast data network, determining in the network interface the IP multicast group address and the IP source address of the IP multicast packet, determining in the network interface if transmission of the IP multicast packet from the network interface to the bus is to be enabled or disabled by comparing the IP multicast group address and the IP source address of the IP multicast packet with the fourth, fifth and sixth data; and upon determining that the transmission of the IP multicast packet is to be enabled, the network interface transmitting the IP multicast packet to the bus, or upon determining that the transmission of the IP multicast packet is to be disabled, the network interface not transmitting the IP multicast packet to the bus. In one such embodiment the network interface maintains a timer for each IP source address in the source-list, the timer being used to manage the duration of each IP source address stored in the memory of the network interface. In yet another embodiment the network interface maintains a group timer when the state record comprises an EXCLUDE mode, the group timer being used to manage the duration of the EXCLUDE mode.

BRIEF DESCRIPTION OF THE DRAWINGS

Other advantages and features of the present invention can be seen in the following description in which, with a non-limiting character, preferred embodiments are referred to in relation to the attached drawings.

DETAILED DESCRIPTION

Figure 7A:
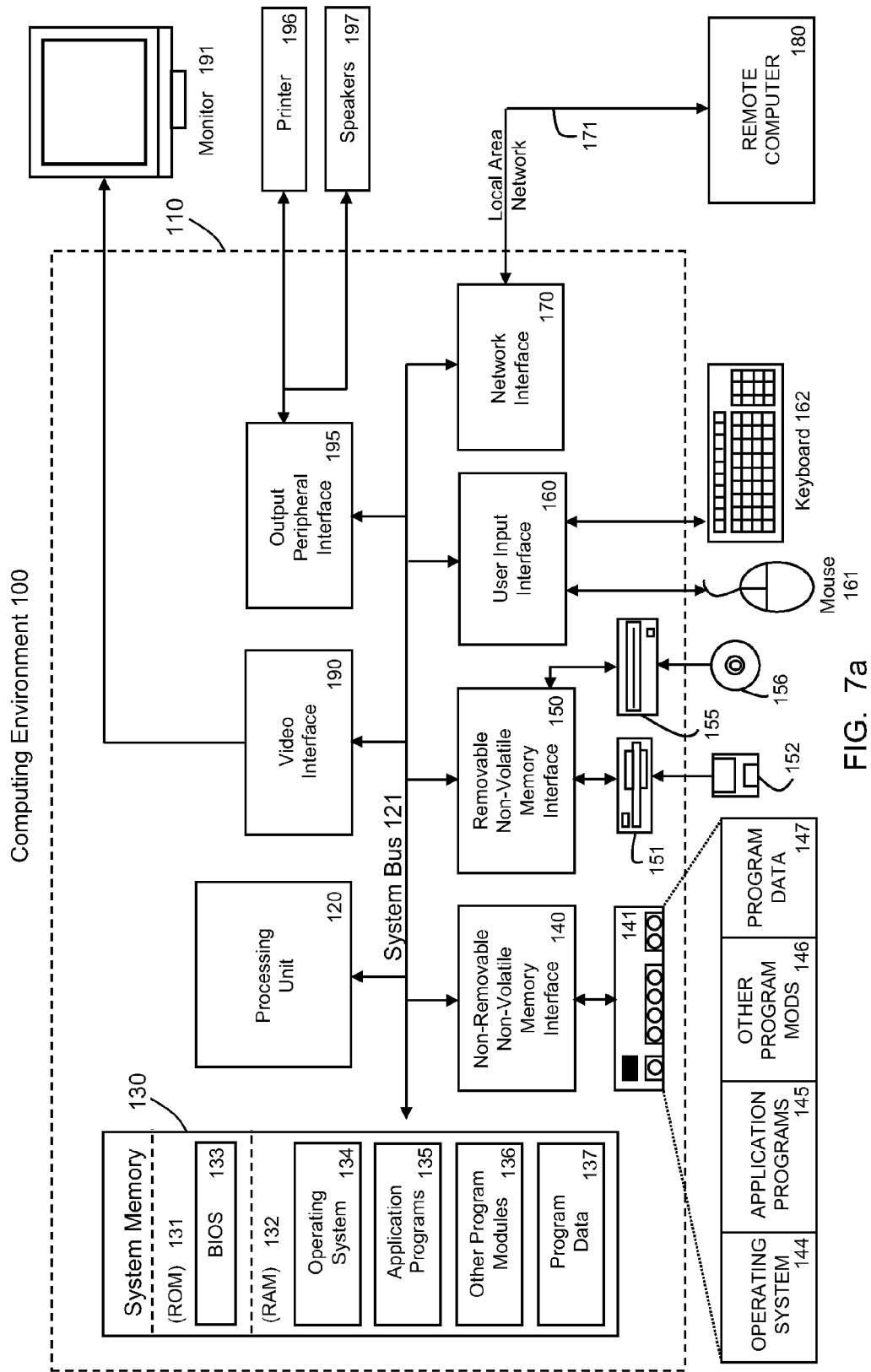
FIG. 7a is a block diagram of an exemplary computer system that may implement the present invention.
Figure 7B:
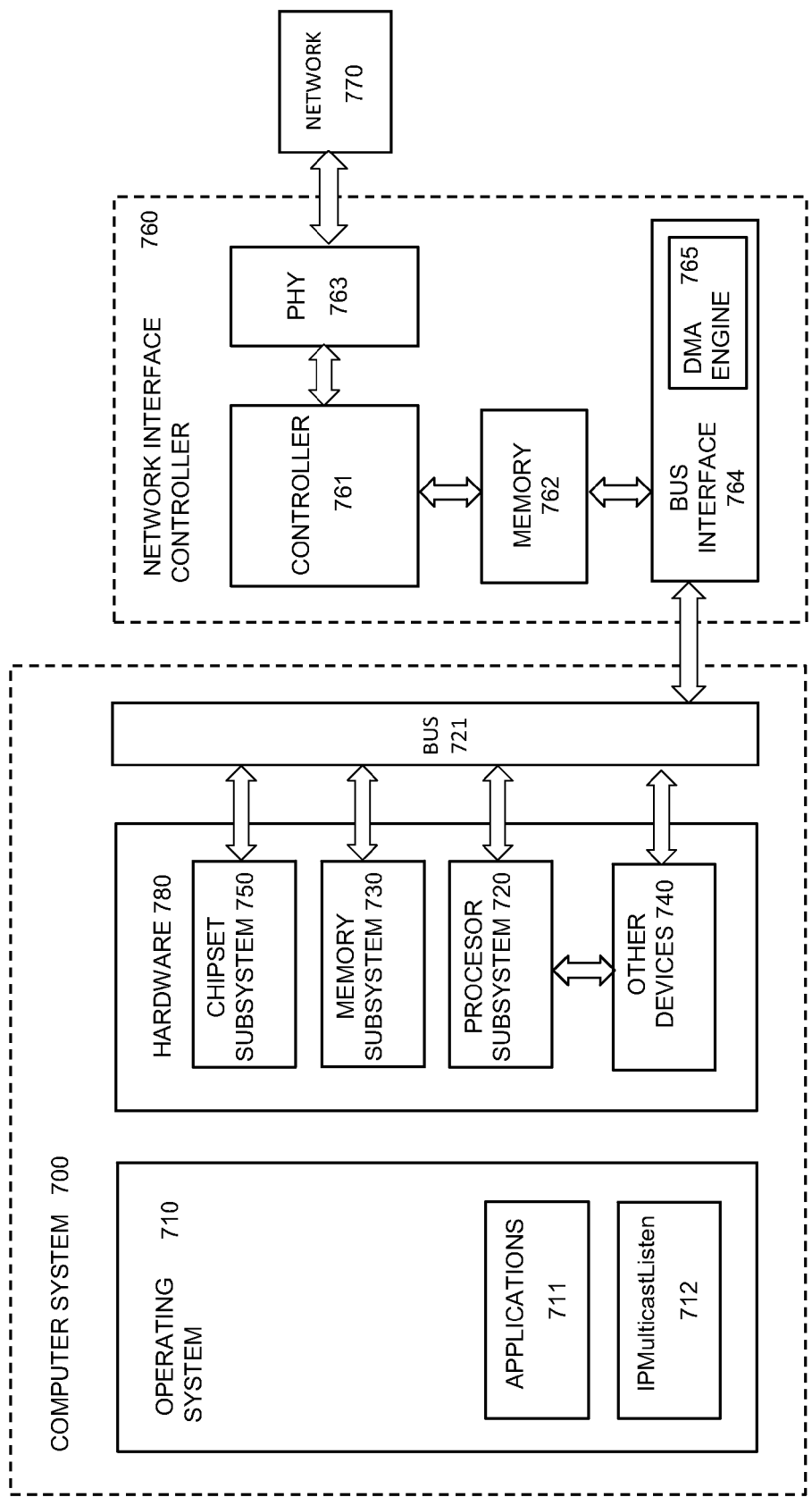
FIG. 7b is a block diagram of another exemplary computer system that may implement the present invention.
Figure 8:
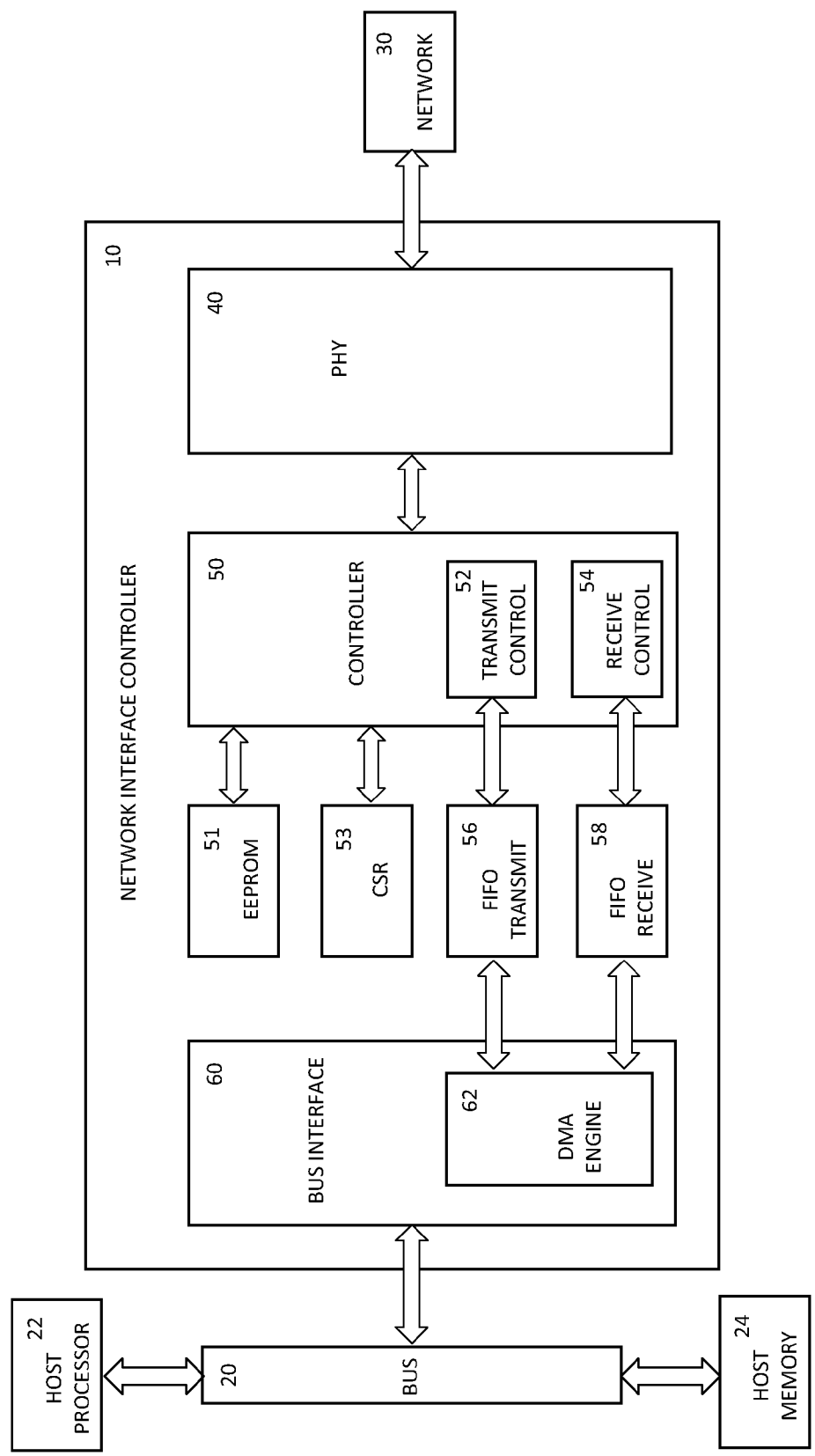
FIG. 8 is a block diagram of an exemplary network interface that may implement the present invention.

By way of illustration and for exemplary purposes only, FIGS. 7a, 7b and 8 are provided to aid in the description of the various implementations disclosed herein. It is to be understood that the computer systems of FIGS. 7a and 7b and the network interface of FIG. 8, as illustrated and described herein, represent several of many ways to implement the inventions disclosed herein. In addition, although the following description is based primarily on the IGMP protocol, the various implementations described herein may also be applied to the MLD protocol or to protocols similar to the IGMP and MLD protocols.

FIG. 7a is a block diagram of an exemplary computer system environment 100 in which aspects of the invention may be implemented. The computer system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, hand-held or laptop devices, multiprocessor systems, microprocessor-based systems, set top boxes, televisions, programmable consumer electronics, network PCs, minicomputers, mainframe computers, distributed computing environments that include any of the above systems or devices, and the like.

With reference to FIG. 7a, an exemplary system for implementing the invention includes a general purpose computing device in the form of a computer system 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data.

Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 7a illustrates operating system 134, application programs 135, other program modules 136, and program data 137.

The computer system 110 may also include other removable/non-removable, volatile/non-volatile computer storage media. By way of example only, FIG. 7a illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7a, provide storage of computer readable instructions, data structures, program modules and other data for the computer system 110. In FIG. 7a, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. The application programs or other program modules of the computer system 110 can contain, among other things, computer instructions which, when executed cause the computer system to operate or perform functions like, for example, the IPMulticastListen function.

A user may enter commands and information into the computer through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer system 110 operates in a networked environment using logical connections to one or more remote computing devices 180. The remote computing device(s) 180 may be a personal computer, a server, a router, a network PC, a peer device or other common network node, and typically includes a portion or all of the elements described above relative to the computer system 110. The logical connections depicted in FIG. 7a include a local area network (LAN) 171, but may also include other networks. Such networking environments are commonplace in offices, enterprise-wide computer networks, intranets and the Internet.

The network interface 170 provides an interface to outside networks, which may comprise many interconnected computer systems/devices and communication links as explained above. These communication links may be wire line links, optical links, wireless links or any other mechanism for communication of information. In an embodiment of the present invention, network 171 supports an Ethernet protocol with the network interface being connected to a LAN networking environment. The network interface 170 may take any of a variety of forms including that of a network card that is installed inside the computer system 110 or an embedded component or chip that is a part of the computer system 110, or it may be a part of another component, like for example a computer motherboard or an expansion card. In one embodiment of the present invention, as will be described in more detail below, the network interface is implemented as part of a chipset of the computer system 110.

FIG. 7b is another example of a computer system 700 which can communicate via a network 770 with other computer systems. Computer system 700 includes or is otherwise connected to a network interface 760 that communicates with the computer system 700 via a bus 721. The computer system 700 includes a processor subsystem 720 which may include a processor, a memory subsystem 730, and a core logic subsystem or chipset 750. The chipset 750 provides bridges among the processor subsystem 720, the computer system memory subsystem 730 and the bus 721. The computer system 700 may also include other devices 740 like, for example, a hard disk or a keyboard.

The network interface 760 provides an interface to external networks (e.g., network 770), which may comprise many interconnected computer systems and communication links. These communication links may be wire line links, optical links, wireless links or any other mechanism for communication of information. In an embodiment described herein, network 770 supports an Ethernet protocol. The network interface controller 760 may take the form of a network card that is installed inside the computer system 700 or it may refer to an embedded component or chip that is a part of the computer system 700, like for example a component of other devices 740. As mentioned above in the description of FIG. 7a, network interface 760 may be implemented as a part of chipset of the computer system 700. FIG. 7b depicts some of the components of the network interface 760 in accordance with one implementation. As shown, the network interface of FIG. 7b includes a controller 761, a PHY 763, a memory 762 and a bus interface 764 having a direct memory access (DMA) engine 765.

The memory subsystem 730 of computer system 700 typically includes a number of memories including a main random access memory (RAM) for storage of instructions and data during program execution, and a read only memory (ROM) in which fixed instructions and data are stored. The memory subsystem may also include one or more levels of cache memory. For the sake of simplicity, the computer system memory subsystem 730 is sometimes referred to herein as "computer system memory". As used herein, virtual memory is considered part of the memory subsystem even though part of it may at times be stored physically on a peripheral device. The memory subsystem 730 contains, among other things, computer instructions which, when executed by the processor subsystem 720, cause the computer system to operate or perform functions like, for example, the operating systems 710, applications 711 and the IPMulticastListen function 712.

The bus 721 provides a mechanism for allowing the various components and subsystems of computer system 700 to communicate with each other. In one embodiment the bus 721 comprises a PCI bus. Other embodiments may include other buses, like for example PCI-X or PCI Express, and may also include multiple buses.

Computer system 700 can be of varying types including a personal computer, a portable computer, a workstation, a computer terminal, a network computer, a television, a mainframe, a server, a router, a switch or any other data processing system or user devices. Due to the ever-changing nature of computers and networks, the computer systems depicted in FIGS. 7a and 7b are intended only as examples for purposes of illustrating embodiments of the present invention. Many other computer system configurations are possible having more or less components, and configured similarly or differently than those depicted in FIGS. 7a and 7b.

Turning now to FIG. 8, a block diagram of an exemplary network interface 10 in which the present invention may be implemented is shown. It is to be appreciated however, that the various implementations described herein are not limited to any particular type of network interface. The network interface 10 may take any of a variety of forms as discussed above. For example, the network interface 10 may take the form of a network card that is installed inside a computer system or it may refer to an embedded component of a chip or chipset of a computer system, or it may be a part of another component, like for example a computer motherboard or an expansion card.

As shown in FIG. 8, in one implementation network interface 10 includes a controller 50, a PHY transceiver 40, various forms of memory 51, 53, 56, 58 and a bus interface 60 comprising a DMA engine 62. The bus interface 60 facilitates communication with a bus 20 of a computer system (such as buses 121 and 721 described above) that has a processor 22 and a memory 24. In the description that follows the terms "computer system" and "host" are used to refer to the device to which the network interface belongs.

In the example of FIG. 8, the network interface 10 is connected to a data network 30 using the PHY transceiver 40. PHY is a common abbreviation for the physical layer of the OSI model. A PHY connects a link layer device (often called MAC) to a physical medium such as, for example, optical fibers or electrically conductive conduits. Information is transmitted to and received from the physical interface through the PHY transceiver 40.

The controller 50 of the network interface 10, which may be a microcontroller or other type of processor, is typically provided to control the transmission and receiving operations of the network interface using appropriate transmit control 52 and receive control 54 programs or state machines. These programs handle the various data control operations required for transmitting and receiving data from a network including, for example, handling error conditions for a collision on the physical medium and retransmitting corrupted data as necessary. In Ethernet networks, for example, most of the functionality desired to implement applicable standards, such as IEEE 802.3, is implemented within the controller 50.

In the network interface of FIG. 8, data coming in and out of controller 50 are buffered in the memory of the network interface by a transmit FIFO 56 and a receive FIFO 58. Communications with the host computer, including the transmission of data to the bus 20 of the host computer are managed by the bus interface 60. In the example of FIG. 8, the network interface 10 also includes a CSR (control status registers) block 53 which can provide the control status registers for supporting communication with the host computer and to store configuration data in the network interface 10. The transmit FIFO 56, receive FIFO 58 and control status registers 53, may be part of the same memory in the network interface 10, or may comprise discrete memory components that include any one of the memories or combinations thereof.

In one implementation, the network 10 also includes an EEPROM 51 which generally includes programming for the controller 50. In one embodiment, EEPROM 51 provides the MAC address (or addresses) assigned to the network interface 10 for use with the computer system/host to which it is coupled.

There are four techniques typically used to transfer data between a peripheral device, such as a network interface, and a processor of a computer system. The transfer of data between a network interface and a computer system may use one or a combination of these techniques. The four techniques are polling, programmed I/O, interrupt-driven I/O and direct memory access (DMA). Direct Memory Access (DMA) is a feature that allows certain hardware components, such as a network interface, associated with a computer system to access the computer system's memory for reading and/or writing with little or no involvement of the computer system's processor. Without DMA, using programmed I/O mode for communicating with peripherals devices, or load/store instructions in the case of multicore chips, the processor of the computer system is typically fully occupied for the entire duration of the read or write operation, and thus unavailable to perform other work. With DMA, the computer system processor can initiate the transfer of data, perform other operations while the transfer is in progress, and receive an interrupt from the DMA controller once the data transfer operation is complete.

In accordance with various implementations of the present invention an improved network interface associated with a computer system/host is provided that filters multicast packets in a manner that reduces or obviates altogether the dedication of host processing resources for the purpose of analyzing and discarding unwanted layer 2 and/or layer 3 multicast data packets. The network interfaces of the present invention may be implemented in different ways, such as, for example, using instructions executed in a processor of a network interface card, using an FPGA (Field Programmable Gate Array), or using an application-specific integrated circuit (ASIC). In alternative embodiments, a network interface of the present invention may be implemented within the computer systems itself as a part of the computer system's integrated circuitry. For example, in one embodiment the network interface is implemented as a part of a computer system's chipset.

Figure 6:
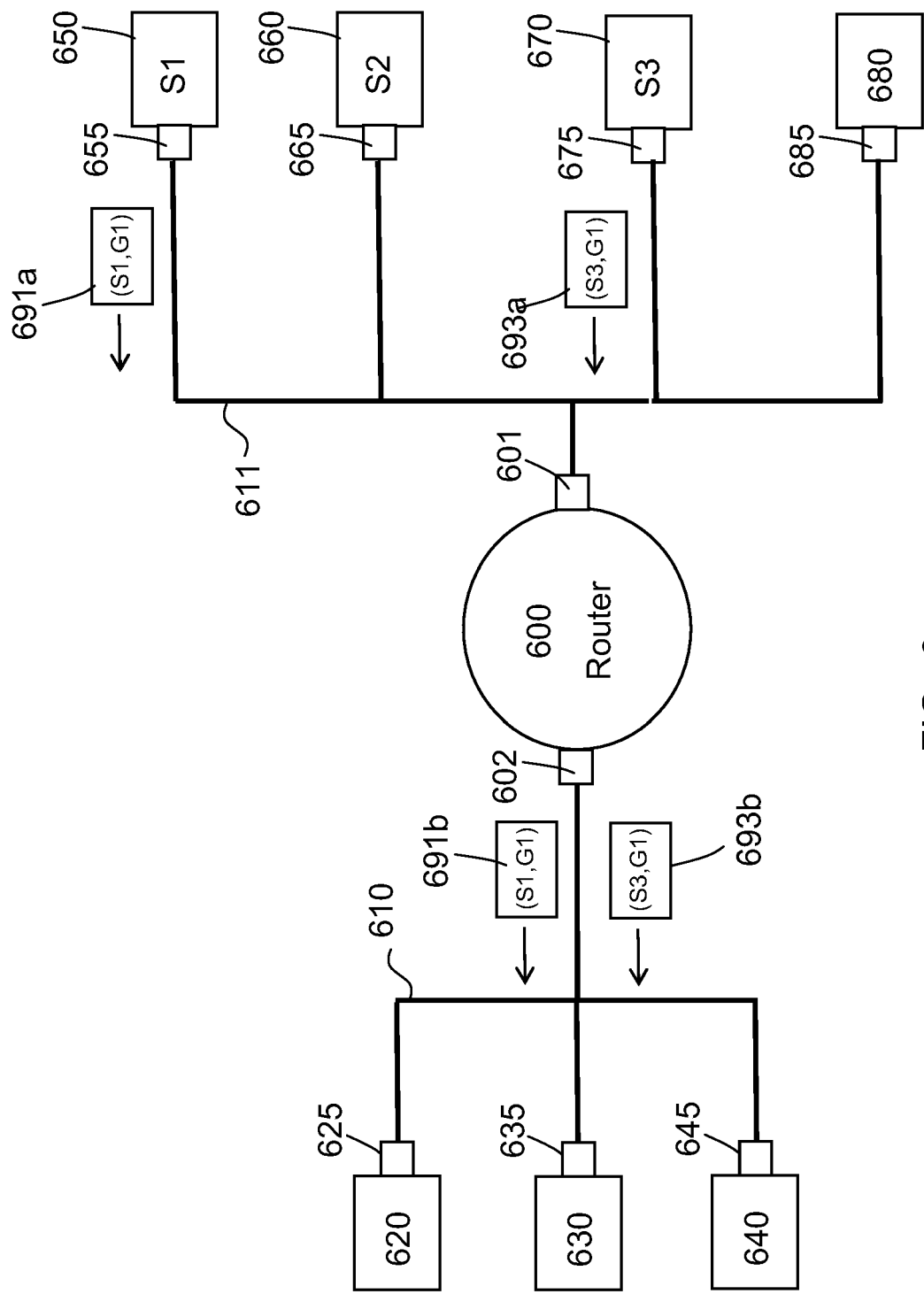
FIG. 6 illustrates an exemplary multicast data network.

For discussion purposes, FIG. 6 will also be used to describe the operation of the various implementations of the present invention. As previously explained, in the prior art when the host 620 of FIG. 6 sends an IGMPv3 message to receive the multicast channel (S1,G1) and the router 600 transmits the multicast packets 691b of the multicast channel (S1, G1) to network 610, the hosts 630 and 640 also receive these multicast packets. This disadvantageously requires hosts 630 and 640 to devote processing resources to filter the unwanted packets. In accordance with various implementations of the present invention, network interfaces 635 and 645 of hosts 630 and 640, respectively, are configured to filter the unwanted packets in a manner that reduces or obviates the use of host processing resources normally needed to analyze and discard the unwanted multicast packets.

In accordance with one implementation, a computer system of the present invention uses the IPMulticastListen function, or other functions, to store in a memory of the computer system information indicative of the multicast traffic an application wishes to receive. In one embodiment the computer system stores the following first state record in a first status register for each active socket:

(interface, multicast-address, filter-mode, {source-list})

In one embodiment, the computer system also stores a separate second state record in a second status register for each network interface and multicast group in the form:
(multicast-address, filter-mode, {source-list})
where:
"multicast-address" is the IP multicast group address.
"filter-mode" is the network interface mode, which may be INCLUDE or EXCLUDE. In the INCLUDE mode, the network interface defines the source-list as INCLUDE; this means that it wishes to receive the multicast group traffic sent by all the sources in the list. In the EXCLUDE mode, the network interface defines the source-list as EXCLUDE; this means that it wishes to receive the multicast group traffic from all the sources sent in the multicast group, except the sources in the list.
"source-list" is a list of zero or more IP source addresses.

In the description herein the term "status register" is not limited to a single memory location, but may also refer to multiple memory locations within a memory. Moreover, throughout the specification the term "state record" is used to describe a record that contains information used by a network interface to perform its filtering function. It is important to note, that although the information may be stored in a single state record within a single memory location, the present invention is not so limited. For example, different parts of the filtering information may be in the form of different state records that may be stored in a common memory location or in different memory locations. However, for the sake of simplicity, in the following description the terms "status register" and "state record" will be used with the understanding that each term may denote the singular or the plural. The present invention is not limited by the manner in which the multicast traffic information is stored in the computer system or in the network interface, as the case may be. For example, the multicast-address, filter-mode and source-list information/data used by a network interface to filter multicast packets may be stored as a unit in a single state record within a single memory location or may be stored separately, or in any combination, in different state records within one or more status registers of the computer system or network interface, as the case may be. What is important is that adequate information be appropriately stored in a location that is accessible to the network interface to enable the network interface to perform its multicast packet filtering function.

In one embodiment, a network interface of the present invention accesses the information of the second status register in the computer system by any of a variety of methods, including, but not limited to polling, programmed I/O, Interrupt-driven I/O and DMA. Filtering of multicast packets in the network interface is achieved by determining in the network interface the multicast group address and IP source address of multicast packets received in the network interface and subsequently comparing the multicast group address and IP source address of the received multicast packet with the accessed data of the second status register.

In one implementation a network interface of the present invention accesses the multicast-address, filter-mode and source-list information by reading the information of the second state record located in the second status register of the computer system. In one embodiment, the network interface uses direct access memory to read the information.

In another implementation, accessing of the multicast-address, filter-mode and source-list information by the network interface is accomplished by the network interface copying the information of the second status register into a status register of the network interface.

In another implementation, accessing of the multicast-address, filter-mode and source-list information by the network interface is accomplished by the computer system sending the information from the second status register to a status register of the network interface. In one embodiment, a driver installed on the computer system sends the information of the second status register to the status register of the network interface.

In another implementation, accessing of the multicast-address, filter-mode and source-list information is accomplished by an IPMulticastListen operation, or the like, in the computer system writing the information into a status register of the network interface. In one embodiment, the IPMulticastListen operation, or the like, writes the information to the computer system memory and network interface memory substantially simultaneously.

In one or more alternative embodiments, the multicast-address, filter-mode and source-list information is stored in a state record within a status register of the network interface in the same form of the second state stored in the computer system memory (e.g., (interface, multicast-address, filter-mode, {source-list}))

When a network interface of the present invention receives a multicast data packet that the host does not wish to receive, the network interface uses the accessed multicast-address, filter-mode and source-list information to filter unwanted multicast data packets in a manner that reduces or prevents altogether the host's operating system 710 and/or the host's hardware 780 from having to assign resources in order to analyze and discard unwanted multicast packets. Alternative network interface filtering examples are explained later in conjunction with FIGS. 9 and 10.

In one implementation, a network interface of the present invention is configured to never filter certain multicast packets. For example, in one embodiment the network interface does not filter the multicast packets that have the destination IP address 224.0.0.1 known as "All Hosts Multicast Address"

which is used, for example, by the IGMPv3 routers to send IGMPv3 query messages to the hosts. In another embodiment, a network interface (for example 760) always sends to the host hardware 780 and/or operating system 710 multicast packets having the all hosts link-scope address (i.e., the IPv6 address FF02::1).

In alternative embodiments of the present invention, the network interface may be configured so that it always filters or always accepts traffic from certain IP multicast addresses (layer 3) or link-layer multicast addresses (layer 2) independently of the information stored in the computer system or network interface multicast state records. The expression "multicast configuration registers" is used hereinafter to refer to these registers that store information about layer 2 and layer 3 multicast traffic that are always filtered or never filtered by the network interface independently of the state records stored in the computer system and/or network interface. In such a case, that will be described in more detail below in conjunction with the discussion of FIG. 11, the network interface checks first these layers 2 and/or layer 3 multicast configurations registers to see if a multicast packet must always be filtered or never filtered. If no multicast configuration register is found for the multicast layer 2 and/or layer 3 destination addresses of the multicast packet, the network interface accesses the multicast-address, filter-mode and source-list information as previously described to determine whether to transmit or filter the multicast packet. In one embodiment, an application executed on the operating system of the host can be used to configure the layer 2 and/or layer 3 multicast configuration registers.

In one implementation, the network interface stores layer 2 multicast address and layer 3 multicast address information in different memory locations. For example, the network interface may store the following layer 2 and layer 3 state records:

Layer 2: (multicast destination MAC address, TRANSMIT(1)/FILTER(0))

Layer 3: (multicast-address, filter-mode, {source-list})

Where, in the layer 2 record, the first data in the record is the multicast layer 2 destination address and the second data in the record comprises information/data indicative of whether to always filter or never filter the multicast packets having the layer 2 destination address. In one embodiment a value "1" indicates that the multicast packet having the layer 2 destination address is to never be filtered and the value "0" indicates that the multicast is always to be filtered. The layer 3 record may be similar to the multicast state records previously explained.

Figure 9:
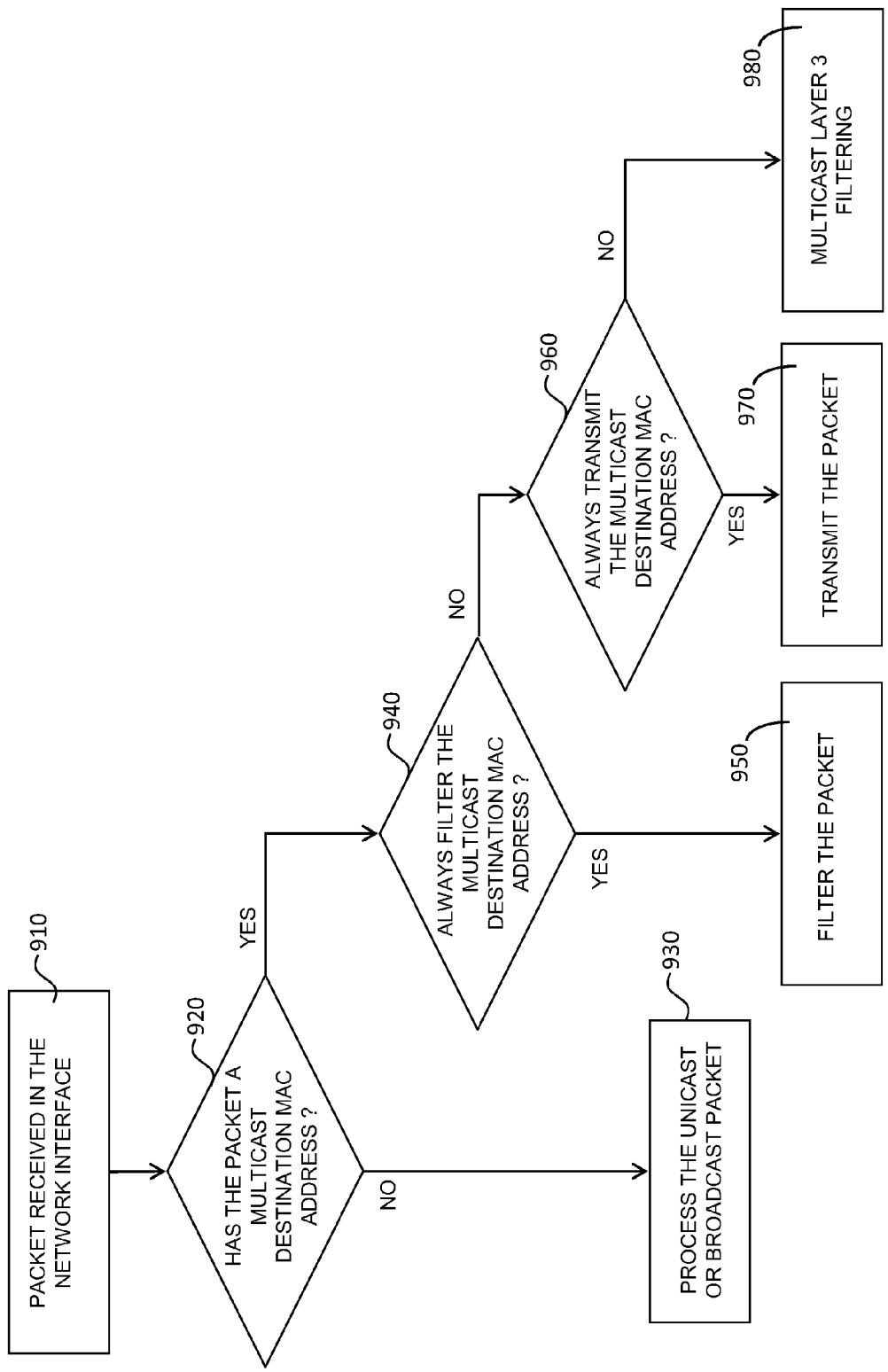
FIG. 9 is a flow chart that illustrates a layer 2 multicast filtering method according to one implementation of the present invention.
Figure 10:
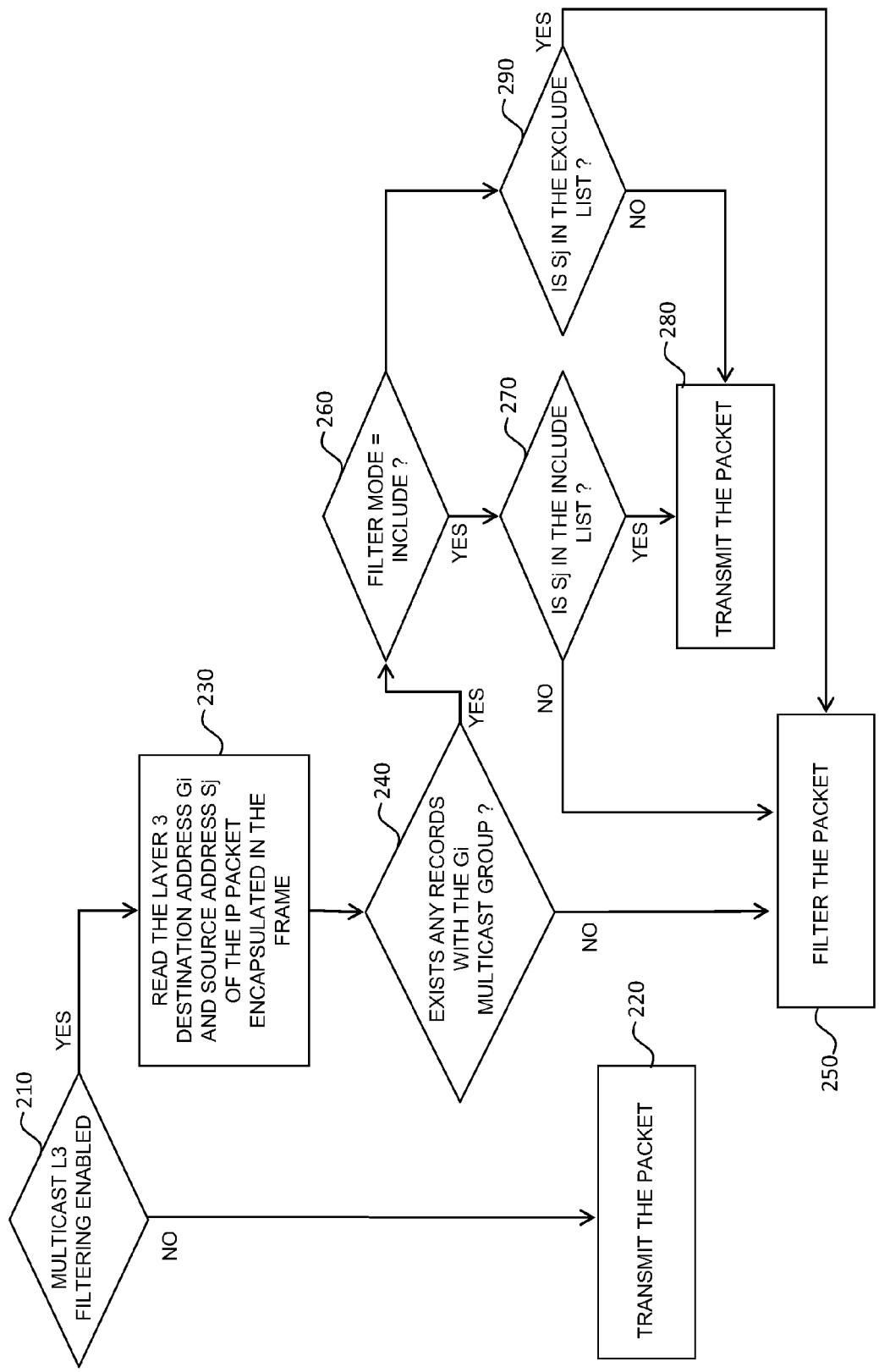
FIG. 10 is a flow chart that illustrates a layer 3 multicast filtering method according to one implementation of the present invention.

FIGS. 9 and 10 are flow charts showing exemplary processes for filtering layer 2 multicast packets and layer 3 multicast packets, respectively. In the description of FIG. 9 the term "MAC address" is used to refer to a layer 2 address. It is important to note that the present invention is not limited to MAC addresses but is also applicable to other types of layer 2 addresses.

With reference to FIG. 9, the network interface receives at step 910 a layer 2 multicast packet from the data network. At step 920, the network interface checks if the packet has a multicast destination MAC address. If the packet does not have a multicast destination MAC address (i.e., the first 5 bits of the destination MAC address are different from 01:00:5e), the network interface processes the packets as being a unicast or broadcast packet at step 930 by transmitting the packet to be processed by the host.

If, on the other hand, the packet has a multicast destination MAC address, the network interface at step 940 checks if there is a stored layer 2 state record for this specific multicast destination MAC address specifying that the layer 2 multicast destination address is always to be filtered. If so, the packet is filtered at step 950. Otherwise, the packet is not filtered and the process continues at step 960.

At step 960, the network interface determines if there is a stored layer 2 state record for the multicast destination MAC address specifying that multicast packets having this address are to be always transmitted to the host. If so, the multicast packet is transmitted to the computer system at step 970.

In one implementation, when the packet received in the network interface is determined to have a layer 2 destination address but no layer 2 state record is stored in the network interface, the packet is further processed using layer 3 filtering at step 980. An exemplary layer 3 filtering process is depicted shown FIG. 10.

With reference to FIG. 10, a flow chart of a layer 3 source specific multicast filtering process in one embodiment of the present invention is shown. As mentioned above, an application in the host may be used to enable or disable the filtering function of a network interface of the present invention, both in layer 2 and layer 3 filtering. In the embodiment of FIG. 10, at step 210 it is determined whether the filtering function of the network interface is enabled. If the filtering function is not enabled all the multicast packets received in the network interface are transmitted to the computer system at step 220. If the network interface filtering function is enabled, the network interface reads the layer 3 destination address Gi (multicast group address) and the source address Sj of the IP packet encapsulated in the received frame at step 230. In step 240, the network interface checks if it has stored any multicast state records with the Gi multicast address group. If there is no state record stored in the network interface for the Gi multicast group address, the network interface determines that the computer system does not want the Gi multicast group address packets and filters the packet at step 250. Otherwise, if there is a state record for the Gi multicast group address, the network interface determines the filter mode of the record (i.e., INCLUDE or EXCLUDE).

At step 260, the network interface checks if the state record for the multicast group address Gi has an INCLUDE filter mode. If the filter-mode of the state record is INCLUDE, the network interface checks if the source Sj of the IP packet is included in the {source-list} of the state record at step 270. If the filter-mode is determined to be an INCLUDE filter mode and the source Sj is in the source-list, the network interface transmits the packet at step 280 to be processed by the computer system. If the source Sj is not in the source-list, the network interface filters the packet at step 250.

If the filter-mode of the state record (at step 260) is not in INCLUDE, it can only be EXCLUDE. When the filter-mode is EXCLUDE, the network interface checks if the source Sj of the IP packet is in the {source-list} of the state record at step 290. If the source Sj is in the source-list of the state record, the network interface filters the packet at step 250. If, on the other hand, the source Sj is not in the source-list of the state record with filter-mode EXCLUDE, the network interface transmits the packet to be processed by the computer system at step 280.

In one implementation, a network interface of the present invention consults the multicast state records stored or otherwise accessed by the network interface to perform its multicast traffic filtering function. In another embodiment, a network interface of the present invention may use both the accessed state record information and also information stored in the multicast configuration register(s) in the course of performing its multicast traffic filtering function. In the latter case a conflict may exists between the two types of information. For example, a configuration register may indicate to always transmit the multicast traffic from the multicast channel (S1,G1) to the computer system but there may be an accessed multicast state record derived from, for example, the IPMulticastListen function of the computer system for the G1 multicast address with an EXCLUDE filter mode and S1 in the EXCLUDE list. In this case the network interface may be configured to behave according to the multicast configuration register(s) or according to the accessed multicast state records derived from, for example, the IPMulticastListen function of the computer system. For example, if the network interface is configured to use by default the multicast configuration registers, then it will always transmit to the computer system the packets from the multicast channel (S1,G1).

In one embodiment of the present invention, the network interface may be configured so that the multicast filtering function can be enabled or disabled using a host application. For example, in one embodiment a software application of the "driver" type may be used to configure the manner in which the network interface operates. This allows the network interface to function in a mode where no multicast packets are filtered. In one implementation, the "enable" or "disable" mode of operation is stored in the memory of the network interface in a configuration register.

In another embodiment, the network interface may use the SNMP protocol to configure the information stored in the multicast status registers (memory location or locations of state record information) and/or the configuration registers. For example, the processing unit 761 can include an SNMP agent that is used to configure the network interface 760 by communicating with an "SNMP control station" also called "SNMP Network Management System" that configures the SNMP agent using the SNMP protocol.

Figure 11:
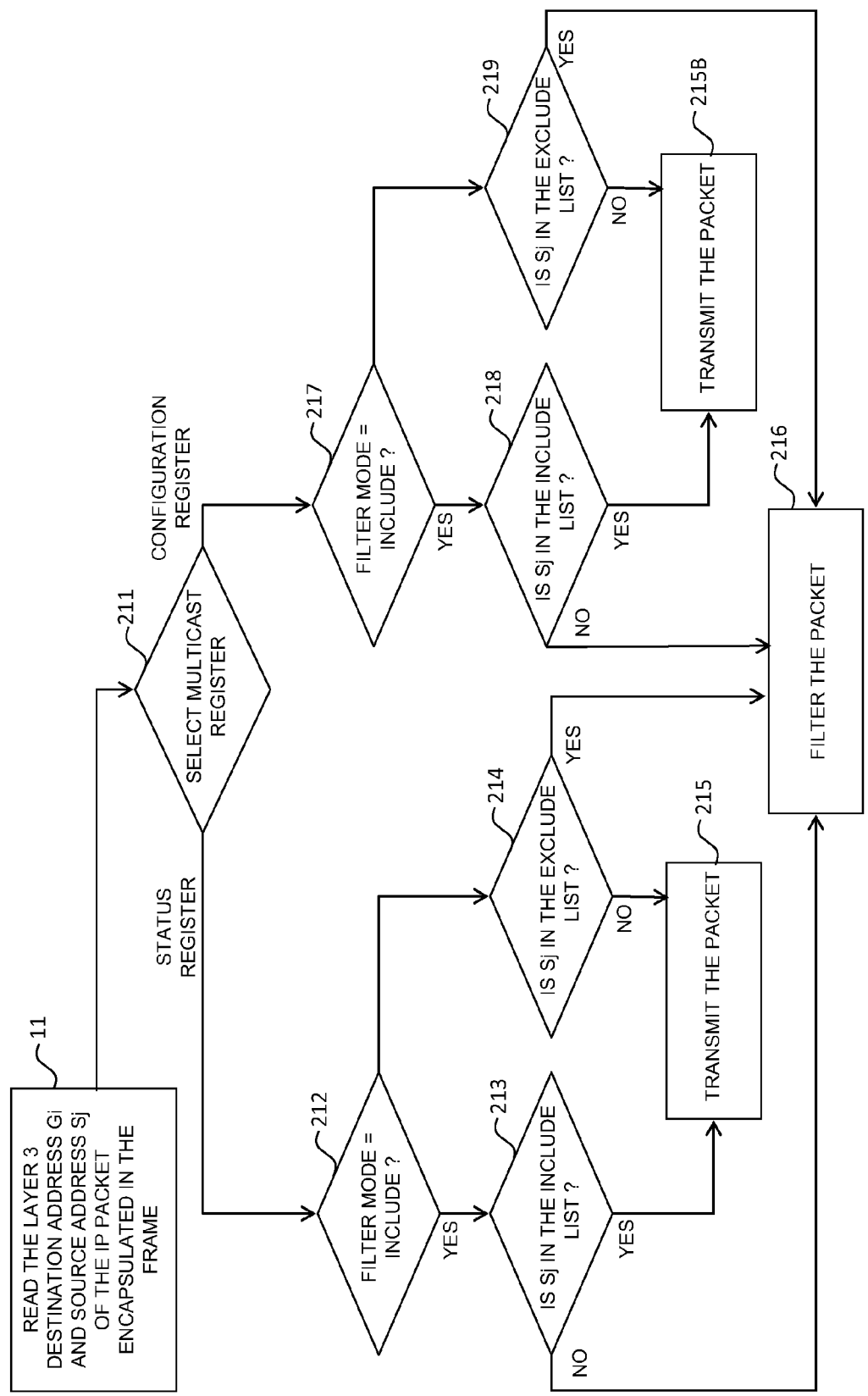
FIG. 11 illustrates a flow chart that illustrates a multicast filtering method according to another implementation of the present invention.

FIG. 11 shows an example of the layer 3 source specific multicast filtering in one embodiment of the present invention when the network interface receives a multicast IP packet for a multicast group Gi and the network interface has stored a multicast state record information in a multicast status register for the group Gi and also a multicast configuration register for the same group Gi.

In step 11 the network interface reads the multicast destination address Gi and the unicast source address Sj of the IP multicast packet. As an initial step, the network interface determines if a conflict exists between the multicast configuration registers and the multicast status registers stored or accessed by the network interface. If a conflict is determined to exists, the network interface selects between either using the multicast configuration registers or the multicast status registers to filter incoming multicast packets at step 211. Upon selecting the multicast status registers the process continues at step 212. Upon selecting the multicast configuration register the process continues at step 217.

At step 212, the network interface controller checks if the multicast status register for the multicast group address Gi has an INCLUDE filter mode. If the filter-mode of the multicast status register is INCLUDE, the network interface controller checks, at step 213, if the source Sj of the IP packet is included in the INCLUDE list of the multicast status register. If it is in the INCLUDE list, the network interface transmits the packet at step 215 to be processed by the computer system. If the source Sj is not in the INCLUDE list, the network interface filters the packet at step 216.

If the filter-mode of the multicast status register (at step 212) is not INCLUDE, it can only be EXCLUDE. When the filter-mode is determined to be an EXLUDE filter mode, the network interface checks if the source Sj of the IP packet is in the EXCLUDE list of the multicast status register at step 214. If the source Sj is in the EXCLUDE list of the multicast status register, the network interface filters the packet at step 216. If the source Sj is not in the EXCLUDE list of the multicast status register with filter-mode EXCLUDE, the network interface transmits the packet at step 215 to be processed by the computer system.

When the multicast configuration register is used to transmit or discard the IP packet the process goes to step 217. At step 217, the network interface checks if the multicast configuration register for the multicast group address Gi has an INCLUDE filter mode. If the filter-mode of the multicast configuration register is INCLUDE, the network interface controller checks, at step 218, if the source Sj of the IP packet is included in the INCLUDE list of the multicast configuration register. If the source Sj is in the INCLUDE list, the network interface transmits the packet at step 215B to be processed by the computer system. If the source Sj is not in the INCLUDE list, the network interface filters the packet at step 216.

If the filter-mode of the multicast configuration register (at step 217) is not INCLUDE, it can only be EXCLUDE. When the filter-mode is EXCLUDE, the network interface checks if the source Sj of the IP packet is in the EXCLUDE list of the multicast configuration register at step 219. If source Sj is in the EXCLUDE list of the multicast configuration register, the network interface filters the packet at step 216. If the source Sj is not in the EXCLUDE list of the multicast configuration register, the network interface transmits the packet at step 215B to be processed by the computer system.

The network interface of the present invention can be configured, for example manually using a driver or user application or remotely using the SNMP protocol, to always use a multi-cast status register or to always use a multicast configuration register when both registers exist. In one embodiment, the network interface is configured to select between using a multicast status register or a multicast configuration register on a multicast group basis. That is, the network interface is configured to use the multicast status register to filter multicast packets having a multicast destination address G1 when a conflict exists between the multicast status register and the multicast configuration register. However, the same network interface may be configured to use the multicast configuration register to filter multicast packets having a multicast destination address G2 when a conflict exists between the multicast status register and the multicast configuration register.

The ARP protocol, which is known in the art and not explained here, enables a layer 2 unicast address to be associated with a layer 3 unicast address. This relationship between layer 2 addresses and layer 3 addresses may be used in alternative embodiment of the present invention to filter source specific multicast traffic in a network interface by using layers 2 filters that use both the link layer destination address and the link layer source address.

In alternative implementations, the multicast-address, filter-mode and source-list information of a multicast state record of a network interface of the present invention are obtained by the network interface reading multicast traffic membership messages sent by the computer system through the network interface to equipment located in the data network. For example, when the computer system sends an IGMPv3 Membership Report Message to a router or other equipment in the data network, the network interface reads information in the message and creates multicast state records for the purpose of filtering packets not wanted by the computer system. For example, in the network interface 10 of FIG. 8 the processing unit 50 detects in a data packet received from the computer system an IGMP multicast traffic membership message and, in addition to transmitting the packet with the IGMP message through its physical interface 40 to the data network 30, the processing unit 50 also extracts information from the IGMP message and stores it in a memory of the network interface. In one embodiment, the network interface 10 stores the extracted information in a multicast state record in one of the control status register 53 for each multicast group for which the network interface sends an IGMP membership message.

The network interface can detect that it is transmitting IGMP messages in several ways. The first way is by analyzing the value of the fields called "Protocol" in the header of the IPv4 packets and "Next Header" in the header of the IPv6 packets. In IGMP messages, the "Protocol" field of the header of the IPv4 packet transporting the IGMP message has a value of 2. In MLD messages, the "Next Header" field of the header of the IPv6 packet preceding the MLD message has a value of 58, because MLD messages are sent as a special type of ICMP message. When an ICMP message transports an MLD message, the "Message Type" field of the ICMP message has a value of 130.

In one embodiment of the present invention, to avoid examining all the IP packets that it transmits, the network interface 10 can analyze only IP packets in accordance with the destination address of each IP packet that it transmits. For example, in IGMPv3, the Membership Report Messages sent by the hosts have the destination address 224.0.0.22, which all the IGMPv3 routers listen on. Therefore, if the computer system only uses IGMPv3, it is sufficient for the network interface to analyze the IP packets whose destination address is 224.0.0.22. In a similar way, the analysis of MLDv2 packets that use IPv6 address FF02::16 can be limited.

Other versions of the IGMP protocol, such as IGMPv2 version, use different multicast destination addresses and the present invention can take them into consideration in order to detect IGMP messages. The "Internet Group Management Protocol, Version 2" is described in the RFC 2236 specifications, W. Fenner, November 2007, available at the URL www.ietf.org/rfc/rfc2236.txt.

Figure 1:
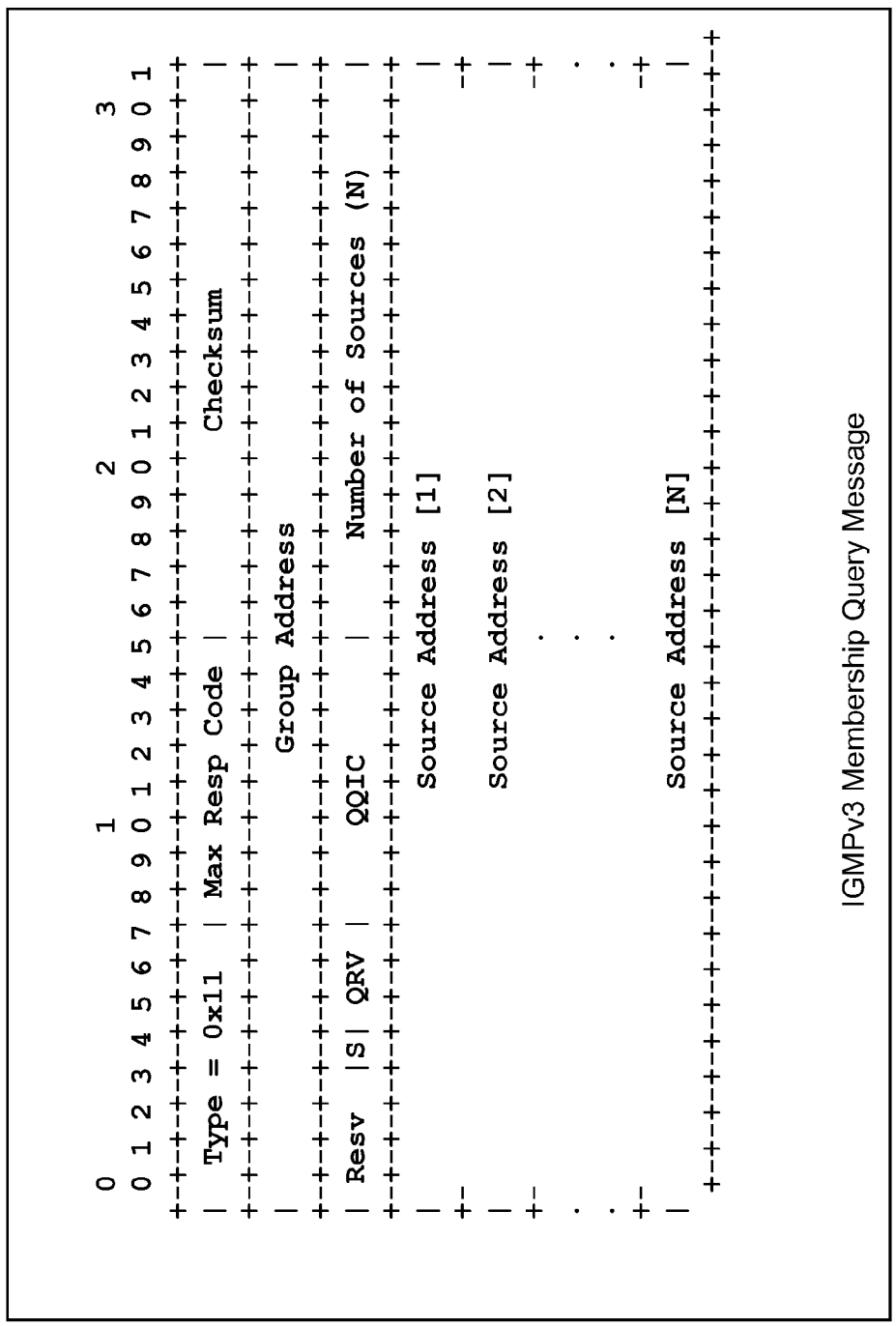
FIG. 1 shows an IGMPv3 Query type message.
Figure 2:
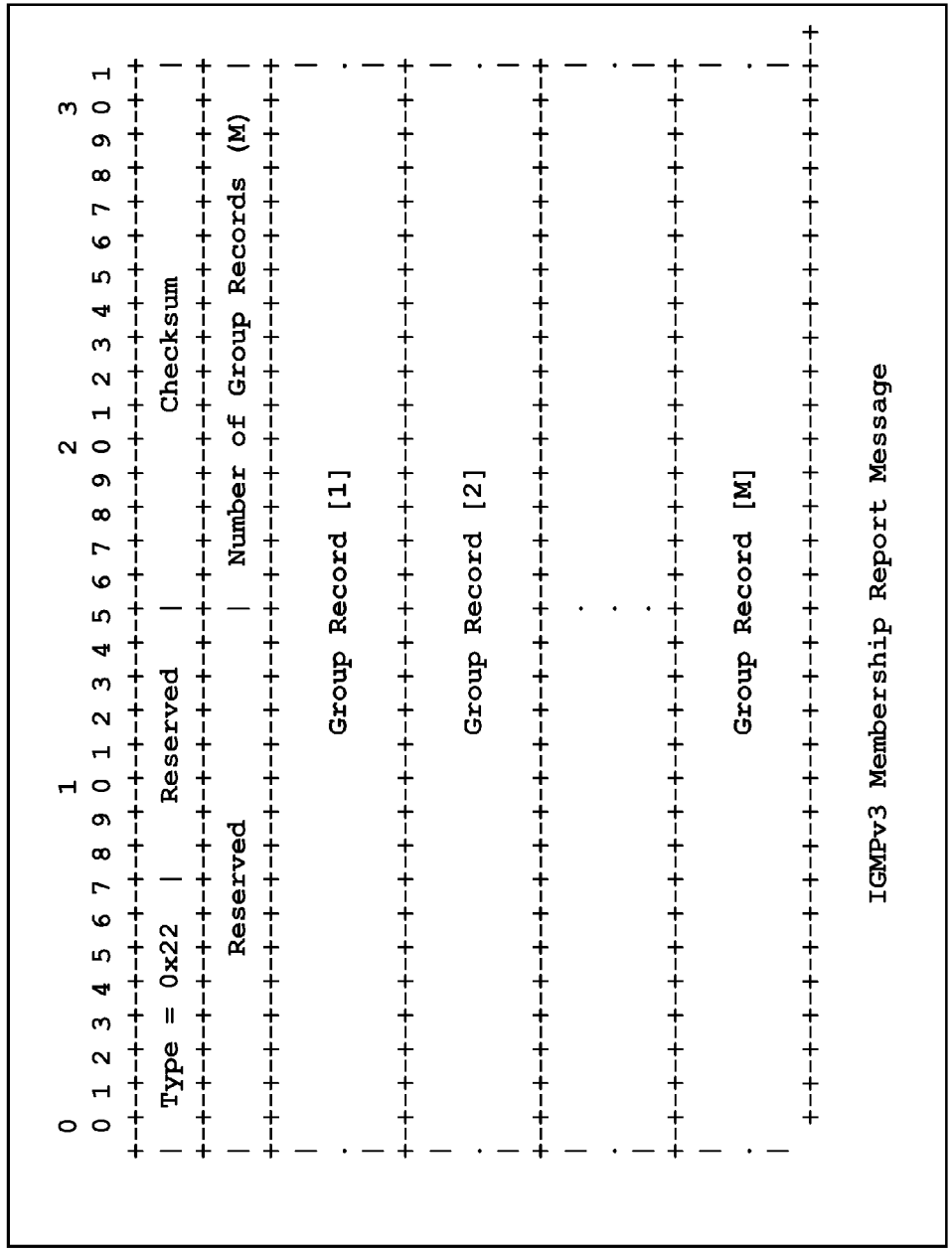
FIG. 2 shows an IGMPv3 Membership Report type message.
Figure 3:
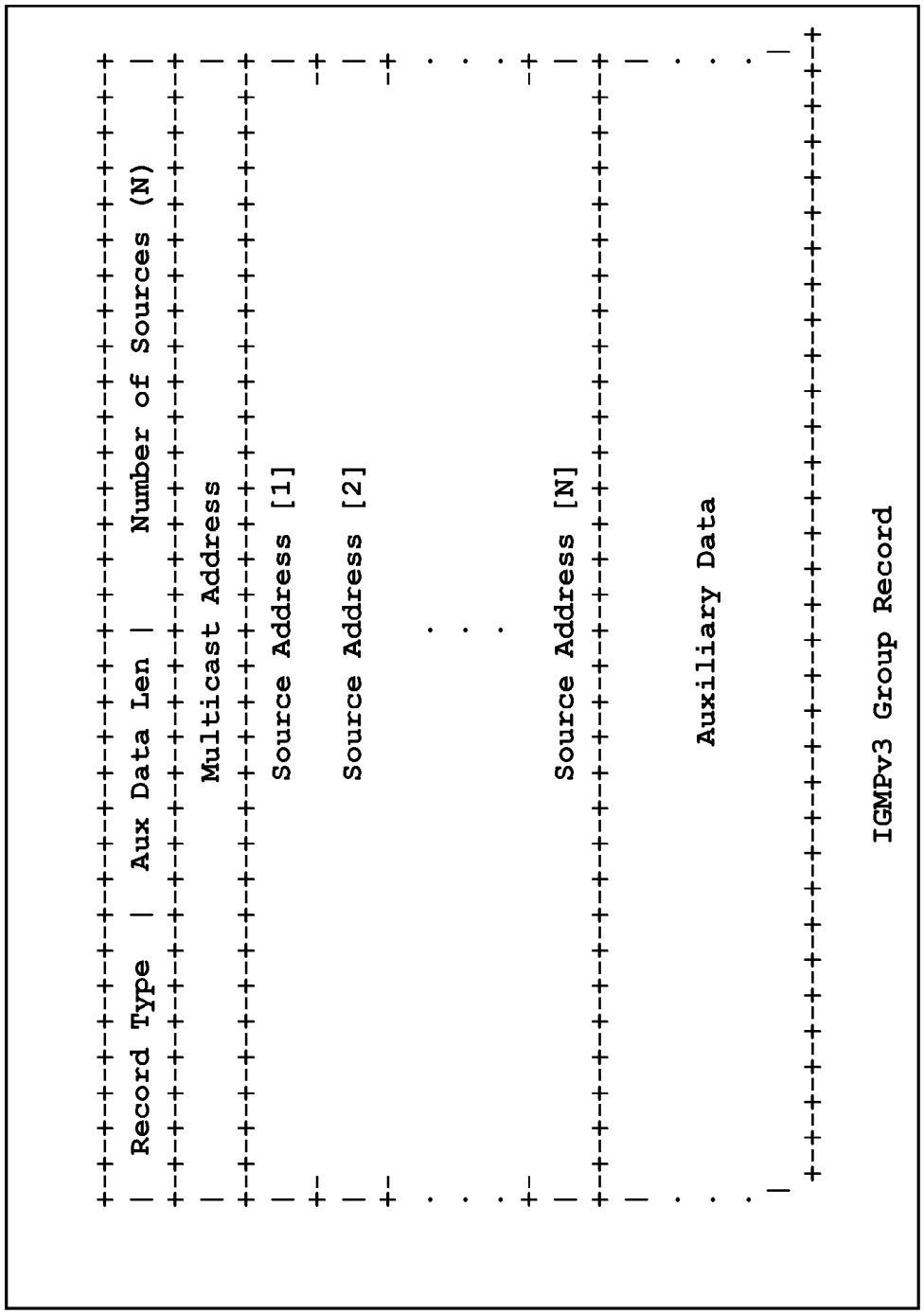
FIG. 3 shows the forming of the "Group Record" blocks contained in IGMPv3 Membership Report type messages.
Figure 4:
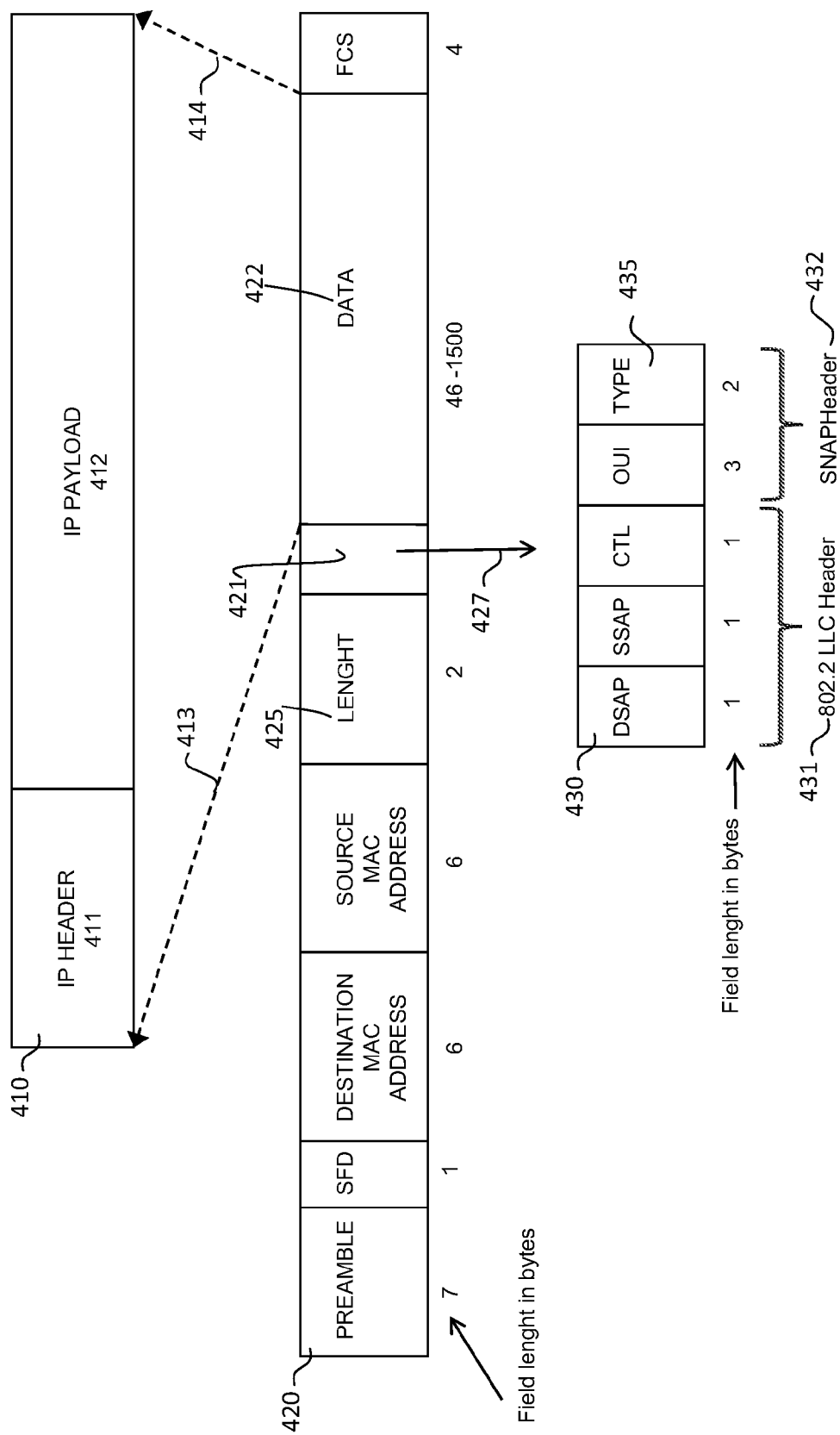
FIG. 4 illustrates a type of Ethernet packet.
Figure 5:
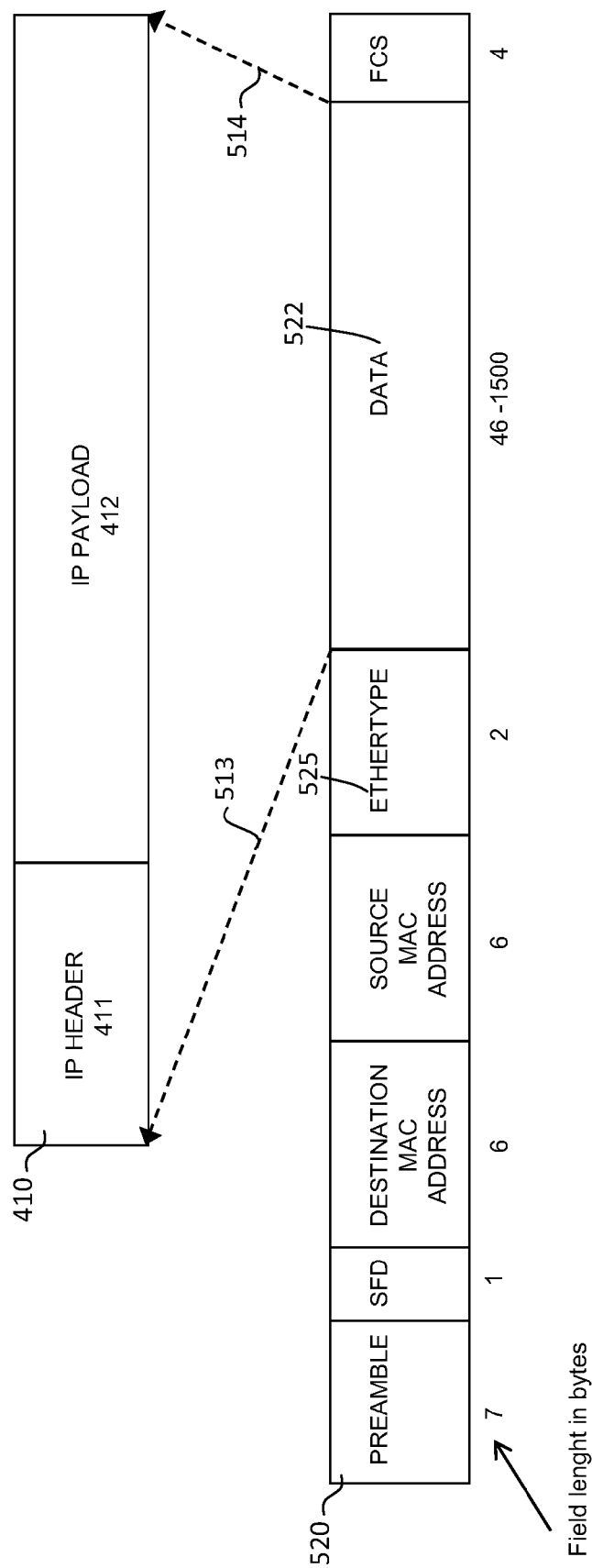
FIG. 5 illustrates another type of Ethernet packet.

When the network interface detects that it is transmitting a data packet containing an IGMP message, the network interface can extract the information contained in the IGMP message from the structure of the Membership Report Messages described previously in FIGS. 2 and 3. In the same way, the present invention can extract information from the IGMP messages corresponding to other versions of the IGMP, like IGMPv1 and IGMPv2.

Figure 12:
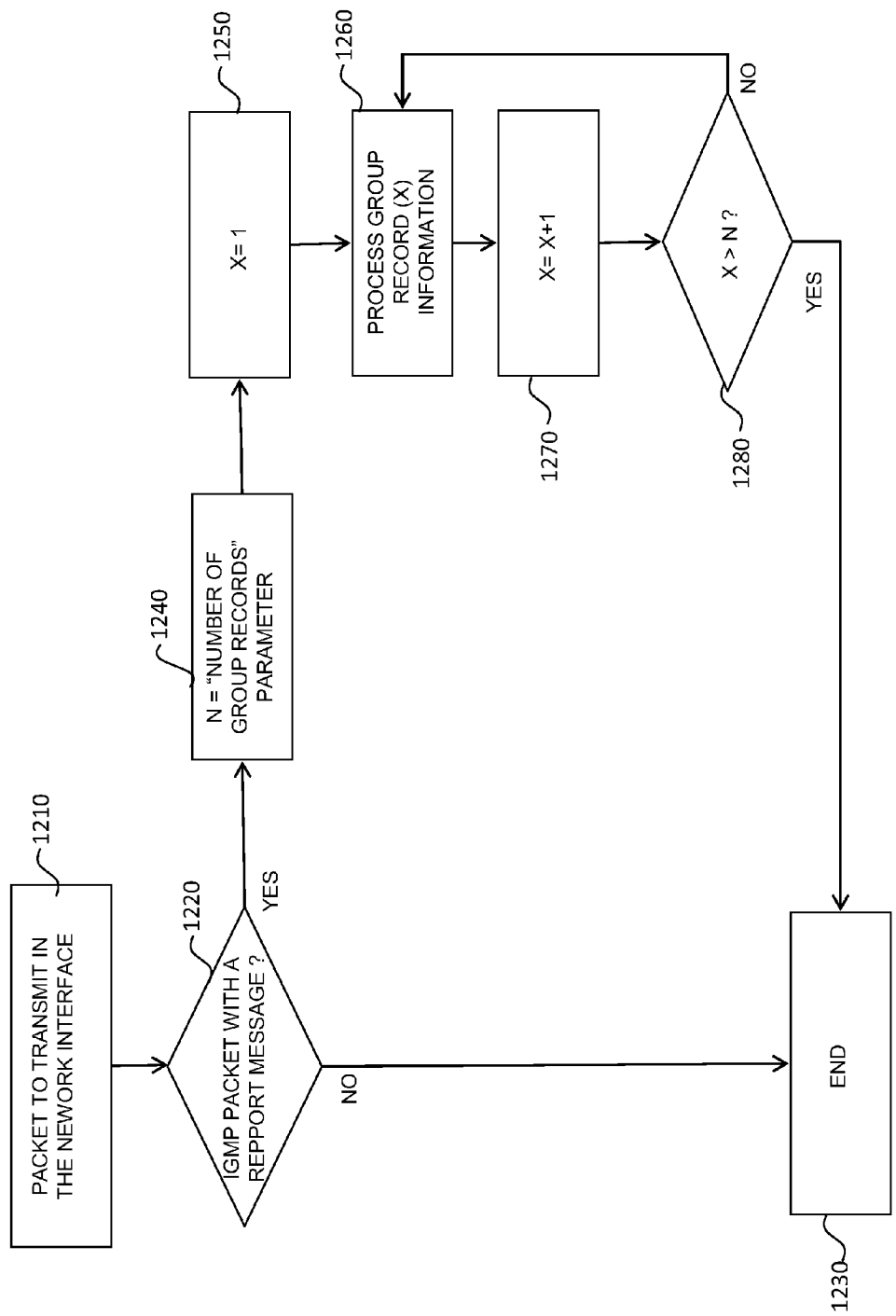
FIG. 12 illustrates a flow chart that illustrates a multicast filtering method according to yet another implementation of the present invention.

FIG. 12 is a flow chart of one exemplary process using the IGMPv3. At step 1210 a network interface of the present invention receives from the computer system a layer 2 data packet to transmit to a data network through its PHY. At step 1220 the network interface determines if the layer 2 data packet contains an IP packet containing an IGMP Membership Report message. If the data packet doesn't contain an IGMP Membership Report message the process ends at step 1230.

If the data packet does contains an IGMP Membership Report message then in step 1240 the variable N is used to store the number of Group Records blocks of data included in the Membership Report message. This information is stored in the parameter called "Number of Group Records" in FIG. 2.

At step 1250 the process starts with the first Group Record. At step 1260 the information of each Group Record is processed using, for example, one or a combination of processes of Tables 2, 3, 4, 5 and/or 6 which are explained in more detail below. At steps 1270 and 1280 all of the Group Records of the Membership Report message are processed. When all the Group Records of a Membership Report message are processed according to one of the processes of Tables 2, 3, 4, 5 and/or 6 then the process ends at step 1230.

The discussion that follows relates to a process implemented in a network interface for deriving multicast packet filtering information and storing the information in a memory of the network interface. In one implementation, the network interface obtains the filtering information by reading the group records of an IGMPv3 membership report message and storing for each multicast group address the information in a multicast state record of the network interface. In one embodiment, upon receiving an IGMPv3 membership report message for a multicast group address, the multicast status record for the multicast group address is updated according to one of the processes of Table 2. Table 2 uses the same terminology explained before in the description of Table 1. In Table 2 the six IGMPv3 messages are indicated as IS_IN(B), IS_EX (B), ALLOW(B), BLOCK (B), TO_EX(B) and TO_IN(B). Using these messages, in one embodiment the network interface of the present invention creates and/or updates a set of multicast status records stored in the memory of the network interface. The format of the multicast state records stored in the network interface for a multicast group address may use one of the following formats depending on the filter-mode:

(multicast address, INCLUDE, {source list and timers})

(multicast address, group timer, EXCLUDE, {source list and timers})

In this embodiment the network interface uses source timers to manage the duration of each source in the multicast state record. In addition, when the filter-mode of a multicast state record is an EXCLUDE filter mode, the network interface may also use a group timer to change the filter mode from EXCLUDE to INCLUDE when the group timer expires.

According to one implementation, when no existing multicast state record exists for a multicast group in the memory of the network interface, the process considers the initial state (STATE 1) of the multicast state record to have an INCLUDE filter mode with an empty source list. In this way, a multicast state record for a multicast group may be created by the network interface using two types of messages: IS_IN (B) or IS_EX (B) in the manner depicted below:

| STATE 1 | MESSAGE | STATE 2 | ACTIONS |
| --- | --- | --- | --- |
| 1. INCLUDE ({ }) | IS_IN (B) | INCLUDE (B) | T(B)=GMI |
| 2. INCLUDE ({ }) | IS_EX (B) | EXCLUDE ({ },B) | T(B)=0<br>GT=GMI |

In the case where a multicast state record for a multicast group already exists in the memory of the network interface, the network interface updates the multicast state record according to Table 2. In the embodiment of Table 2, the first column represents the two possible initial states (STATE 1) of a multicast state record (INCLUDE(A) or EXCLUDE(X,Y)). As shown in Table 2, depending on the type of IGMPv3 membership report message received in the network interface (column 2) and the initial state (STATE 1) of the multicast state record (column 1), there are a total of twelve processes for updating the multicast state record as shown in columns 2 and 3. In addition, when a multicast state record for a multicast group has a filter mode INCLUDE with an empty list of sources, the multicast state record may be deleted from the memory of the network interface.

In this way, by creating, updating and removing multicast state records using information derived from the IGMP membership messages, a network interface of the present invention can store in its memory multicast state records that indicate the multicast traffic the computer system wants to receive and can filter the multicast traffic using, for example, the processes of FIG. 9, 10 or 11 as previously explained.

There may be instances where the computer system sends multicast traffic membership message from two or more different applications. For example, one application of the computer system may use an IPMulticastListen operation as previously described, while another application of the computer system uses an operation other than IPMulticastListen to send multicast traffic membership messages. In such instances the multicast state records stored in the memory of the network interface used for the purpose of filtering unwanted multicast packets may be updated according to one of the processes of Table 3.

By comparing the processes in row 1 of Tables 2 and 3, a difference in the operation of a network interface according to the embodiments of Table 2 and Table 3 becomes evident. As illustrated in Table 3, the network interface continues transmitting to the computer system multicast traffic from source A after receiving an IS_IN(B) type membership message, while in the embodiment of Table 2 source A is removed from the INCLUDE source list upon receiving an IS_IN(B) type membership message without waiting for the timer associated with source A to reach zero as is the case in the embodiment of Table 3.

In order to take advantage of the deterministic filtering behavior of a network interface that updates in its memory multicast state records according to the processes of Table 2 (and also Tables 3, 4, 5 and 6 described below), in one embodiment of the present invention the computer system merges the multicast traffic requests from the different applications and sends to the network interface a single multicast traffic membership message for each multicast group address.

Turning again to Table 2, in rows 2, 4, 7 and 11 the updated multicast state records of STATE 2 have an EXCLUDE filter mode with an empty "requested list". The "requested list" is shown by the left part of the group of sources, EXCLUDE:

EXCLUDE (X, Y)=EXCLUDE ({Requested list}, {Exclude list})

Rows 2, 4, 7 and 11 of Table 2 are reproduced below where these empty groups are shown with the symbol "{ }":

| STATE 1 | MESSAGE | STATE 2 | ACTIONS |
|---|---|---|---|
| 2. INCLUDE (A) | IS_EX (B) | EXCLUDE ({ },B) | T(B)=0<br>DEL(A-B)<br>GT=GMI |
| 4. INCLUDE (X,Y) | IS_EX (B) | EXCLUDE ({ },A) | T(A)=0<br>OF(X+Y)-A<br>GT=GMI |
| 7. INCLUDE (A) | TO_EX (B) | EXCLUDE ({ },B) | T(B)=0<br>OF (A-B)<br>GT=GMI |
| 11. EXCLUDE (X,Y) | TO_EX (A) | EXCLUDE ({ },A) | T(A)=0<br>OF<br>(X+Y)-A<br>GT=GMI |

In rows 9 and 10 of Table 2 the updated multicast status registers of STATE 2 have an EXCLUDE filter mode without an empty "requested list". Rows 9 and 10 of Table 2 are reproduced below:

| STATE 1 | MESSAGE | STATE 2 | ACTIONS |
|---|---|---|---|
| 9. EXCLUDE (X,Y) | ALLOW (A) | EXCLUDE (X+A,Y-A) | T(A)=GMI |
| 10. EXCLUDE (X,Y) | BLOCK (A) | EXCLUDE (X-A,Y+A) | T(A)=0 |

In row 9, the "requested list" has the (X+A) value and in row 10 has the (X-A) value. However, the reason the requested list in rows 9 and 10 do not have an empty list is because the initial state (STATE 1) of the multicast state records of both rows 9 and 10 have an initial EXCLUDE (X,Y) status that assumes that the requested list has an initial group of X sources which is not an empty group. However, in order for the network interface to create a multicast state record with filter mode EXCLUDE it is first necessary that the network interface receives one of the two IS_EX or TO_EX type multicast traffic membership messages, the operation of which is indicated in rows 2, 4, 7 and 11 above. As explained above, in all four cases, the requested list of the updated multicast state record of STATE 2 is an empty list. Therefore, the assumption that an initial state (STATE 1) of a multicast state record cannot have an empty "requested list" as represented in rows 9 and 10 of Table 2 is not true. Thus, the requested list of a multicast state record of STATE 1 of rows 9 and 10 of Table 2 always has an empty requested list because this EXCLUDE record was created with one of the four processes presented by rows 2, 4, 7, 11 of Table 2. As a result, rows 9 and 10 of Table 2 can be rewritten as follows:

| STATE 1 | MESSAGE | STATE 2 | ACTIONS |
|---|---|---|---|
| 9. EXCLUDE ({ },Y) | ALLOW (A) | EXCLUDE ({ },Y-A) | T(A)=GMI |
| 10. EXCLUDE ({ },Y) | BLOCK (A) | EXCLUDE ({ },Y+A) | T(A)=0 |

Table 4 describes an operation of a network interface in which multicast state records do not have a requested list. As a result, when the group timer associated with the multicast state record reaches zero, the multicast state record is deleted or otherwise ignored by the network interface for the purpose of filtering multicast packets. Another advantage associated with the processes of Table 4 is that there is no need for the network interface to maintain or actualize source timers for EXCLUDE filter mode sources since the exclude list of sources have timer values equal to zero.

Turning again to Table 1, a router that uses IGMPv3 maintains timers to track for each network interface and multicast group time intervals related to when multicast traffic requests are received in the network interface and uses these timers to decide how to manage traffic requests that include different sources from the same multicast group. In a similar way, routers using the MLD protocol also maintain timers. Table 1 shows the operation of a router using IGMPv3 which illustrates the use of such timers.

The GMI parameter used in Table 1 as an initial value of the timers is a parameter called "Group Membership Interval" that uses a default value of 260 seconds. Below is a detailed explanation of the operation of this GMI parameter and how its value is calculated. The GMI value is calculated using three other parameters, also mentioned in section 8 of RFC 3376, using the following formula:

$$GMI = [(\text{Robustness Variable}) \times (\text{Query Interval})] + (\text{Query Response Interval})$$

The default values of these three parameters in the IGMPv3 protocol are:
Robustness Variable=2
Query Interval=125 seconds
Query Response Interval=10 seconds
This way, the default value of the GMI parameter is $$GMI=(2\times125)+10=250+10=260 \text{ seconds}$$

Below is an explanation of these three parameters that establish the GMI value.

The Robustness Variable parameter allows the adjustment of the GMI value according to the expected number of lost IP packages. This parameter uses the value 2 as default and it is sent from the router to the computer systems with the QRV field of the "Query" messages that the router sends to the computer systems to ask them for the multicast traffic they wish to receive. QRV is an abbreviation of "Queries Robustness Variable". Its use in Queries is explained in section 4.1.6 of RFC 3376.

In the computer systems, the Robustness Variable value received through the QRV parameter indicates the number of times that a computer system must re-transmit messages to the router when there is a change in the multicast traffic that this computer system wants to receive.

The "Query Interval" parameter is the time interval that passes between two "General Query" messages sent through the router to the computer systems. By default, it takes the value of 125 seconds. A General Query is a message sent from the router to the computer systems so that all of the computer systems respond with messages that detail the multicast traffic that each computer system wants to receive. This way, the IGMPv3 routers update all of the traffic information that the computer systems want to receive every 125 seconds by default.

The "Query Response Interval" parameter indicates the maximum time that the computer systems have to respond to a query from the IGMPv3 router. By default, it takes the 10 second value and it is transmitted to the computer systems in the parameter called "Max Resp Code" from the queries, as explained in section 4.1.1 of RFC 3376.

When a computer system receives a query, the computer system does not respond immediately to the router, instead it delays its response message during a random calculated time between 0 seconds and the "Query Response Interval", for example 10 seconds. This way, if there are thousands of computer systems connected to one router, the router does not receive thousands responses at the same time; rather, it receives the responses from the thousands of computer systems in a 10-second time interval and this way the router has more time to process the responses.

In Table 1 the GMI value is used as a starting value in the timers in all of the cases in which the router receives a multicast traffic request that includes or may include a new multicast data source. This happens in all cases shown in Table 1 except in cases 6 and 10 that correspond to the BLOCK (B) and BLOCK (A) messages, respectively, and that notify the router to stop transmitting multicast traffic from sources B and A respectively from a specific multicast group. In other cases in Table 1 the GMI parameter is used as a starting value for the timers for the new data sources from which the computer systems want to receive multicast traffic from a specific multicast group.

Table 5 explains the operation of a network interface in accordance with another embodiment of the present invention. In the implementation of Table 5 the multicast state records maintained by the network interface do not have associated with them any source timers or group timers. The operation of Table 5 also does not involve the use of an EXCLUDE record having a "requested list". If the filter mode of the multicast state record for a multicast group address is INCLUDE, the network interface transmits to the computer system the traffic from the INCLUDE source list. If the filter mode of the multicast state record for a multicast group address is EXCLUDE, the network interface transmits the traffic from all of the sources, except those from the EXCLUDE list.

As shown in Table 5, the deletion of the timers associated with the sources simplifies the network interface filtering process since it does not need to dedicate storage and processing resources to the timers. A network interface that filters multicast packets in accordance with the principles and processes of Table 5 does not need timers or the requested list, for two reasons. The first reason is that the network interface no longer needs to combine messages from different computer systems. Each message sent by the computer system to the router indicates the multicast traffic that the computer system wants to receive and there is no need to mix the traffic requested by different computer systems into one memory record, which is one of the functions for which timers and the requested list are used in IGMPv3. The second reason is that the formula that is used to calculate the GMI parameter ensures that the network interface will receive the multicast traffic information again wanted by the computer system before the timers that initialize with the GMI value reach zero since the GMI parameter will always be greater than or equal to the Query Interval parameter.

Again, the GMI value in IGMPv3 is calculated as follows:

$$GMI=[(\text{Robustness Variable})\times(\text{Query Interval})]+(\text{Query Response Interval})$$

The default values of these three parameters were:
Robustness variable=2
Query Interval=125 seconds
Query Response Interval=10 seconds
This way, the default value of the GMI parameter is $$GMI=(2\times125)+10=250+10=260 \text{ seconds}$$

Where Query Interval is the time that passes between two General Query messages sent by a router to the computer system and according to the above mentioned formula, the GMI cannot be less than the Query Interval value.

In the most critical case, assigning a value of 1 to the Robustness Variable parameter and a value of zero to the Query Response Interval, the GMI value would be the same as the Query Interval value but never less. However, it is enough to maintain the default value of 10 seconds in the Query Response Interval parameter so that GMI is greater than the Query Interval. For example, using the default values, there is no need to assign a 260-second timer to a multicast data source when the information of the sources is updated every 125 seconds, unless they lose the IP packages that carry this information. It is impossible for this timer to reach zero, with the initial value of 260 seconds, before the network interface receives the information from the computer system again at 125 seconds where the computer system notifies the router whether to receive the multicast traffic from each source or not. The timer is unnecessary when the IP packages are not lost.

Therefore, if the traffic sources from each multicast group requested by the computer system are stored, it is no longer necessary to assign timers to multicast data sources and this helps to greatly simplify the process since the network interface only needs to store the data sources that are requested from the computer system.

In another embodiment, the filtering operation of a network interface (as explained in Table 5) may be further simplified as shown in Table 6. In the embodiment of Table 6, the network interface may create a multicast state record upon receiving an IS_IN, IS_EX, TO_IN or TO_EX type multicast traffic membership message from the computer system without considering an initial state.

Since the upstream network interface of an IGMP Proxy functions like a host, in alternative embodiments of the present invention the upstream network interface of an IGMP proxy implements the one or more of the various processes previously described herein to filter multicast packets the IGMP Proxy does not wish to receive.

It should be appreciated that reference throughout this specification to "one embodiment" or "one implementation" or "an embodiment" or "an implementation", or the like, means that a particular feature, structure or characteristic described in connection with the embodiment/implementation is included in at least one embodiment/implementation of the present invention. Therefore, it is emphasized and should be appreciated that two or more references to "an embodiment" or "one embodiment" or "an alternative embodiment(s)" or "an implementation" or "one implementation" or "alternative implementation(s)", or the like, in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments/implementations of the invention, various features of the invention are sometimes grouped together in a single embodiment/implementation, figure, table, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim.

Moreover, although the various embodiments/implementations have been described in conjunction with the IGMP and MLD protocols and the various versions thereof, it is appreciated that the inventions disclosed herein are also applicable to future versions of these protocols and/or other multicast protocols that may be developed.

TABLE 1

Table 1: Operating example of a prior art IGMPv3 router.

| | STATE 1 | MESSAGE | STATE 2 | ACTIONS |
|---|---|---|---|---|
| 1. | INCLUDE (A) | IS_IN (B) | INCLUDE (A+B) | T(B)=GMI |
| 2. | INCLUDE (A) | IS_EX (B) | EXCLUDE (A*B,B−A) | T(B−A)=0 |
| | | | | DEL(A−B) |
| | | | | GT=GMI |
| 3. | EXCLUDE (X,Y) | IS_IN (A) | EXCLUDE (X+A,Y−A) | T(A)=GMI |
| 4. | EXCLUDE (X,Y) | IS_EX (A) | EXCLUDE (A−Y,Y*A) | T(A−X−Y)=GMI |
| | | | | DEL (X−A) |
| | | | | DEL (Y−A) |
| | | | | GT=GMI |
| 5. | INCLUDE (A) | ALLOW (B) | INCLUDE (A+B) | T(B)=GMI |
| 6. | INCLUDE (A) | BLOCK (B) | INCLUDE (A) | SEND Q(G,A*B) |
| 7. | INCLUDE (A) | TO_EX (B) | EXCLUDE (A*B,B−A) | T(B−A)=0 |
| | | | | DEL (A−B) |
| | | | | SEND Q(G,A*B) |
| | | | | GT=GMI |
| 8. | INCLUDE (A) | TO_IN (B) | INCLUDE (A+B) | T(B)=GMI |
| | | | | SEND Q(G,A−B) |
| 9. | EXCLUDE (X,Y) | ALLOW (A) | EXCLUDE (X+A,Y−A) | T(A)=GMI |
| 10. | EXCLUDE (X,Y) | BLOCK (A) | EXCLUDE (X+(A−Y),Y) | T(A−X−Y)=GT |
| | | | | SEND Q(G,A−Y) |
| 11. | EXCLUDE (X,Y) | TO_EX (A) | EXCLUDE (A−Y,Y*A) | T(A−X−Y) =GT |
| | | | | DEL (X−A) |
| | | | | DEL (Y−A) |
| | | | | SEND Q(G,A−Y) |
| | | | | GT=GMI |
| 12. | EXCLUDE (X,Y) | TO_IN (A) | EXCLUDE (X+A,Y−A) | T(A)=GMI |
| | | | | SEND Q(G,X−A) |
| | | | | SEND Q(G) |

TABLE 2

Table 2: Processes for updating in a network interface multicast status records according to an embodiment of the invention.

| | STATE 1 | MESSAGE | STATE 2 | ACTIONS |
|---|---|---|---|---|
| 1. | INCLUDE (A) | IS_IN (B) | INCLUDE (B) | T(B)=GMI |
| | | | | DEL(A−B) |
| 2. | INCLUDE (A) | IS_EX (B) | EXCLUDE ({ },B) | T(B)=0 |
| | | | | DEL(A−B) |
| | | | | GT=GMI |
| 3. | EXCLUDE (X,Y) | IS_IN (A) | INCLUDE (A) | T(A)=GMI |
| | | | | DEL(X+Y)−A |

TABLE 2-continued

Table 2: Processes for updating in a network interface multicast status records according to an embodiment of the invention.

| | STATE 1 | MESSAGE | STATE 2 | ACTIONS |
|---|---|---|---|---|
| 4. | EXCLUDE (X,Y) | IS_EX (A) | EXCLUDE ({ },A) | T(A)=0<br>DEL(X+Y)-A<br>GT=GMI |
| 5. | INCLUDE (A) | ALLOW (B) | INCLUDE (A+B) | T(B)=GMI |
| 6. | INCLUDE (A) | BLOCK (B) | INCLUDE (A-B) | DEL(B) |
| 7. | INCLUDE (A) | TO_EX (B) | EXCLUDE ({ },B) | T(B)=0<br>DEL (A-B)<br>GT=GMI |
| 8. | INCLUDE (A) | TO_IN (B) | INCLUDE (B) | T(B)=GMI<br>DEL(A-B) |
| 9. | EXCLUDE (X,Y) | ALLOW (A) | EXCLUDE (X+A,Y-A) | T(A)=GMI |
| 10. | EXCLUDE (X,Y) | BLOCK (A) | EXCLUDE (X-A,Y+A) | T(A)=0 |
| 11. | EXCLUDE (X,Y) | TO_EX (A) | EXCLUDE ({ }, A) | T(A)=0<br>DEL (X+Y)-A<br>GT=GMI |
| 12. | EXCLUDE (X,Y) | TO_IN (A) | INCLUDE (A) | T(A)=GMI<br>DEL (X+Y)-A |

TABLE 3

Table 3: Processes for updating in a network interface multicast status records according to an embodiment of the invention.

| | STATE 1 | MESSAGE | STATE 2 | ACTIONS |
|---|---|---|---|---|
| 1. | INCLUDE (A) | IS_IN (B) | INCLUDE (A+B) | T(B)=GMI |
| 2. | INCLUDE (A) | IS_EX (B) | EXCLUDE (A*B,B-A) | T(B-A)=0<br>DEL(A-B)<br>GT=GMI |
| 3. | EXCLUDE (X,Y) | IS_IN (A) | EXCLUDE (X+A,Y-A) | T(A)=GMI |
| 4. | EXCLUDE (X,Y) | IS_EX (A) | EXCLUDE (A-Y,Y*A) | T(A-X-Y)=GMI<br>DEL (X-A)<br>DEL (Y-A)<br>GT=GMI |
| 5. | INCLUDE (A) | ALLOW (B) | INCLUDE (A+B) | T(B)=GMI |
| 6. | INCLUDE (A) | BLOCK (B) | INCLUDE (A) | SEND Q(G,A*B) |
| 7. | INCLUDE (A) | TO_EX (B) | EXCLUDE (A*B,B-A) | T(B-A)=0<br>DEL (A-B)<br>GT=GMI |
| 8. | INCLUDE (A) | TO_IN (B) | INCLUDE (A+B) | T(B)=GMI |
| 9. | EXCLUDE (X,Y) | ALLOW (A) | EXCLUDE (X+A,Y-A) | T(A)=GMI |
| 10. | EXCLUDE (X,Y) | BLOCK (A) | EXCLUDE (X+(A-Y),Y) | T(A-X-Y)=GT |
| 11. | EXCLUDE (X,Y) | TO_EX (A) | EXCLUDE (A-Y,Y*A) | T(A-X-Y)=GT<br>DEL (X-A)<br>DEL (Y-A)<br>GT=GMI |
| 12. | EXCLUDE (X,Y) | TO_IN (A) | EXCLUDE (X+A,Y-A) | T(A)=GMI |

TABLE 4

Table 4: Processes for updating in a network interface multicast status records according to an embodiment of the invention.

| | STATE 1 | MESSAGE | STATE 2 | ACTIONS |
|---|---|---|---|---|
| 1. | INCLUDE (A) | IS_IN (B) | INCLUDE (B) | T(B)=GMI<br>DEL(A-B) |
| 2. | INCLUDE (A) | IS_EX (B) | EXCLUDE (B) | T(B)=0<br>DEL(A-B)<br>GT=GMI |
| 3. | EXCLUDE (Y) | IS_IN (A) | INCLUDE (A) | T(A)=GMI<br>DEL(Y)-A |
| 4. | EXCLUDE (Y) | IS_EX (A) | EXCLUDE (A) | T(A)=0<br>DEL(Y)-A<br>GT=GMI |
| 5. | INCLUDE (A) | ALLOW (B) | INCLUDE (A+B) | T(B)=GMI |
| 6. | INCLUDE (A) | BLOCK (B) | INCLUDE (A-B) | DEL(B) |
| 7. | INCLUDE (A) | TO_EX (B) | EXCLUDE (B) | T(B)=0<br>DEL (A-B)<br>GT=GMI |
| 8. | INCLUDE (A) | TO_IN (B) | INCLUDE (B) | T(B)=GMI<br>DEL(A-B) |
| 9. | EXCLUDE (Y) | ALLOW (A) | EXCLUDE (Y-A) | DEL A |
| 10. | EXCLUDE (Y) | BLOCK (A) | EXCLUDE (Y+A) | T(A)=0 |
| 11. | EXCLUDE (Y) | TO_EX (A) | EXCLUDE (A) | T(A)=0<br>DEL (Y-A)<br>GT=GMI |
| 12. | EXCLUDE (Y) | TO_IN (A) | INCLUDE (A) | T(A)=GMI<br>DEL (Y-A) |

TABLE 5

Table 5: Processes for updating in a network interface multicast status records according to an embodiment of the invention.

| | STATE 1 | MESSAGE | STATE 2 | ACTIONS |
|---|---|---|---|---|
| 1. | INCLUDE (A) | IS_IN (B) | INCLUDE (B) | DEL(A−B) |
| 2. | INCLUDE (A) | IS_EX (B) | EXCLUDE (B) | DEL(A−B) |
| 3. | EXCLUDE (Y) | IS_IN (A) | INCLUDE (A) | DEL(Y−A) |
| 4. | EXCLUDE (Y) | IS_EX (A) | EXCLUDE (A) | DEL(Y−A) |
| 5. | INCLUDE (A) | ALLOW (B) | INCLUDE (A+B) | |
| 6. | INCLUDE (A) | BLOCK (B) | INCLUDE (A−B) | DEL(B) |
| 7. | INCLUDE (A) | TO_EX (B) | EXCLUDE (B) | DEL(A−B) |
| 8. | INCLUDE (A) | TO_IN (B) | INCLUDE (B) | DEL(A−B) |
| 9. | EXCLUDE (Y) | ALLOW (A) | EXCLUDE (Y−A) | DEL A |
| 10. | EXCLUDE (Y) | BLOCK (A) | EXCLUDE (Y+A) | |
| 11. | EXCLUDE (Y) | TO_EX (A) | EXCLUDE (A) | DEL (Y−A) |
| 12. | EXCLUDE (Y) | TO_IN (A) | INCLUDE (A) | DEL (Y−A) |

TABLE 6

Table 6: Processes for updating in a network interface multicast status records according to an embodiment of the invention.

| | STATE 1 | MESSAGE | STATE 2 | ACTIONS |
|---|---|---|---|---|
| 1. | | IS_IN (B) | INCLUDE (B) | DEL(ALL−B) |
| 2. | | IS_EX (B) | EXCLUDE (B) | DEL(ALL−B) |
| 3. | INCLUDE (A) | ALLOW (B) | INCLUDE (A+B) | |
| 4. | INCLUDE (A) | BLOCK (B) | INCLUDE (A−B) | DEL(B) |
| 5. | EXCLUDE (Y) | ALLOW (A) | EXCLUDE (Y−A) | DEL(A) |
| 6. | EXCLUDE (Y) | BLOCK (A) | EXCLUDE (Y+A) | |
| 7. | | TO_EX (B) | EXCLUDE (B) | DEL(ALL−B) |
| 8. | | TO_IN (B) | INCLUDE (B) | DEL(ALL−B) |

What is claimed is:

1. A method of filtering multicast packets in a network interface situated between and coupled to a multicast data network and a bus of a computer system, the computer system having a first memory, the method comprising:

storing for the network interface and a multicast group address information in the first memory for the purpose of enabling or disabling transmission through the network interface to the bus of the computer system multicast packets sent from sources using the multicast group address, the information comprising first data that identifies the network interface, second data that identifies the multicast group address, third data that denotes an INCLUDE filter-mode or an EXCLUDE filter-mode, and fourth data that identifies a source-list of zero or more IP source addresses, the network interface accessing the second, third and fourth data, receiving in the network interface a multicast packet from the multicast data network, determining in the network interface the multicast group address and IP source address of the multicast packet, determining in the network interface if transmission of the multicast packet from the network interface to the bus is to be enabled or disabled by comparing the multicast group address and the IP source address of the multicast packet with the accessed second, third and fourth data; and upon determining that the transmission of the multicast packet is to be enabled, the network interface transmitting the multicast packet to the bus, or upon determining that the transmission of the multicast packet is to be disabled, the network interface not transmitting the multicast packet to the bus;

wherein the network interface never transmits to the bus a set of selected multicast packets irrespective of the accessed second, third and fourth data.

2. A method according to claim 1, wherein a user application in an operating system of the computer system is used to select the set of selected multicast packets.

3. A method according to claim 1, wherein a second record identifying the set of selected packets is stored in a second memory of the network interface, the second record having the form (multicast-address, filter-mode, {source-list}).

4. A method according to claim 1, wherein the network interface is configured to never transmit to the bus the set of selected multicast packets by use of the Simple Network Management Protocol (SNMP).

5. A method of filtering multicast packets in a network interface situated between and coupled to a multicast data network and a bus of a computer system, the method comprising:

the network interface accessing, via the bus, information in the computer system for the purpose of enabling or disabling transmission through the network interface to the bus of the computer system multicast packets sent from sources in the multicast data network, the information comprising first data that identifies a multicast group address, second data that denotes an INCLUDE filter-mode or an EXCLUDE filter-mode, and third data that identifies a source-list of zero or more IP source addresses, receiving in the network interface a multicast packet from the multicast data network, determining in the network interface the multicast group address and IP source address of the multicast packet, determining in the network interface if transmission of the multicast packet from the network interface to the bus is to be enabled or disabled by comparing the multicast group address and the IP source address of the multicast packet with the accessed first, second, and third data; and upon determining that the transmission of the multicast packet is to be enabled, the network interface transmitting the multicast packet to the bus, or upon determining that the transmission of the multicast packet is to be disabled, the network interface not transmitting the multicast packet to the bus;

wherein the network interface never transmits to the bus a set of selected multicast packets irrespective of the accessed first, second and third data.

6. A method according to claim 5, wherein a second record identifying the set of selected multicast packets is stored in a memory of the network interface, the second record having the form (multicast-address, filter-mode, {source-list}).

7. A method according to claim 5, wherein the network interface is configured to never transmit to the bus the set of selected multicast packets by use of the Simple Network Management Protocol (SNMP).

8. A method of filtering IP multicast packets in a network interface situated between and coupled to a multicast data network and a bus of a computer system, the method comprising:

the network interface storing information for the purpose of enabling or disabling the transmission of IP multicast packets from sources in the multicast data network through the network interface to the bus of the computer system, the information comprising first data that identifies an IP multicast group address, second data that denotes an INCLUDE filter-mode or an EXCLUDE filter-mode, and third data that identifies a source-list of zero or more IP source addresses, receiving in the network interface an IP multicast packet from the multicast data network, determining in the network interface the IP multicast group address and the IP source address of the IP multicast packet, determining in the network interface if transmission of the IP multicast packet from the network interface to the bus is to be enabled or disabled by comparing the IP multicast group address and the IP source address of the IP multicast packet with the first, second and third data; and upon determining that the transmission of the IP multicast packet is to be enabled, the network interface transmitting the IP multicast packet to the bus, or upon determining that the transmission of the IP multicast packet is to be disabled, the network interface not transmitting the IP multicast packet to the bus;

wherein the network interface never transmits to the bus a set of selected IP multicast packets irrespective of the stored first, second and third data.

9. A method according to claim 8, wherein a second record identifying the set of selected IP multicast packets is stored in the network interface, the second record having the form (multicast-address, filter-mode, {source-list}).

10. A method according to claim 8, wherein the network interface is configured to never transmit to the bus the set of selected IP multicast packets by use of the Simple Network Management Protocol (SNMP).

11. A method of filtering multicast packets in a network interface situated between and coupled to a multicast data network and a bus of a computer system, the computer system having a first memory, the network interface having a second memory, the method comprising:

an application of the computer system initiating a request for the purpose of enabling or disabling reception of multicast packets from the multicast data network, the request comprising first data that identifies the network interface, second data that identifies a multicast group address to which the request pertains, third data that denotes an INCLUDE filter-mode or an EXCLUDE filter-mode, and fourth data that identifies a source-list of zero or more IP source addresses, storing the first, second, third and fourth data in the first memory, the network interface accessing the second, third and fourth data, receiving in the network interface a multicast packet from the multicast data network, determining in the network interface the multicast group address and IP source address of the multicast packet, determining in the network interface if reception of the multicast packet is to be enabled or disabled by comparing the multicast group address and the IP source address of the multicast packet with the second, third and fourth data stored in the second memory; and upon determining that the reception of the multicast packet is to be enabled, the network interface transmits the multicast packet to the bus, or upon determining that the reception of the multicast packet is to be disabled, the network interface not transmitting the multicast packet to the bus;

wherein the network interface never transmits to the bus a set of selected multicast packets irrespective of the accessed second, third and fourth data.

12. A method according to claim 11, wherein a user application in an operating system of the computer system is used to select the set of selected multicast packets.

13. A method according to claim 11, wherein a second record identifying the set of selected packets is stored in a second memory of the network interface, the second record having the form (multicast-address, filter-mode, {source-list}).

14. A method according to claim 11, wherein the network interface is configured to never transmit to the bus the set of selected multicast packets by use of the Simple Network Management Protocol (SNMP).

15. A method of filtering multicast data packets in a network interface situated between and coupled to a multicast data network and a bus of a computer system, the method comprising:

the network interface storing information for the purpose of enabling or disabling the transmission of multicast packets from sources in the multicast data network through the network interface to the bus of the computer system, the information comprising first data that identifies a layer 2 multicast destination address and second data that identifies a layer 2 source address, receiving in the network interface a multicast packet, determining in the network interface the layer 2 destination address and the layer 2 source address of the multicast data packet, determining in the network interface if transmission of the multicast packet from the network interface to the bus is to be enabled or disabled by comparing the layer 2 destination address and the layer 2 source address of the multicast packet with the first and second data; and upon determining that the transmission of the multicast packet is to be enabled, the network interface transmitting the multicast packet to the bus, or upon determining that the transmission of the multicast packet is to be disabled, the network interface not transmitting the multicast packet to the bus;

wherein the network interface never transmits to the bus multicast packets having a second selected layer 2 destination address irrespective of the stored first and second data.

16. A method according to claim 15, wherein a user application in an operating system of the computer system is used to select the second selected layer 2 destination address.

17. A method according to claim 15, wherein the network interface is configured to never transmit to the bus multicast packets having the second selected layer 2 destination address by use of the Simple Network Management Protocol (SNMP).

18. A method of filtering multicast data packets in a network interface situated between and coupled to a multicast data network and a bus of a computer system, the method comprising:

the network interface storing information for the purpose of enabling or disabling the transmission of multicast packets from sources in the multicast data network through the network interface to the bus of the computer system, the information comprising first data that identifies a layer 2 multicast destination address and second data that identifies a layer 2 source address, receiving in the network interface a data packet, determining in the network interface if the data packet is a multicast packet, if upon determining the data packet is not a multicast packet, the network interface transmits the data packet to the bus, if upon determining the data packet is a multicast packet, the network interface determines the layer 2 destination address and the layer 2 source address of the multicast packet, determining in the network interface if transmission of the multicast packet from the network interface to the bus is to be enabled or disabled by comparing the layer 2 destination address and the layer 2 source address of the multicast packet with the first and second data; and upon determining that the transmission of the multicast packet is to be enabled, the network interface transmitting the multicast packet to the bus, or upon determining that the transmission of the multicast packet is to be disabled, the network interface not transmitting the multicast packet to the bus;

wherein the network interface never transmits to the bus multicast packets having a second selected layer 2 destination address irrespective of the stored first and second data.

19. A method according to claim 18, wherein a user application in an operating system of the computer system is used to select the second selected layer 2 destination address.

20. A method according to claim 18, wherein the network interface is configured to never transmit to the bus multicast packets having the second selected layer 2 destination address by use of the Simple Network Management Protocol (SNMP).

* * * * *